US 9,239,046 B2

(12) United States Patent
Wang

(10) Patent No.: US 9,239,046 B2
(45) Date of Patent: Jan. 19, 2016

(54) AIR PUMP FOR MEASURING AN AIR PRESSURE

(71) Applicant: BETO Engineering and Marketing Co., Ltd, Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 370 days.

(21) Appl. No.: 13/782,285

(22) Filed: Mar. 1, 2013

(65) Prior Publication Data

US 2013/0230414 A1    Sep. 5, 2013

(30) Foreign Application Priority Data

Mar. 5, 2012  (TW) .............................. 101107318 A
Sep. 11, 2012  (TW) .............................. 101133110 A

(51) Int. Cl.
| F04B 33/00 | (2006.01) |
| F04B 39/00 | (2006.01) |
| G01L 23/10 | (2006.01) |
| G01L 11/02 | (2006.01) |

(52) U.S. Cl.
CPC .............. *F04B 33/005* (2013.01); *F04B 39/00* (2013.01); *G01L 11/025* (2013.01); *G01L 23/10* (2013.01)

(58) Field of Classification Search
CPC ........ F04B 33/00; F04B 33/005; F04B 39/00; F04B 9/14; F04B 39/0016; F16J 10/02
USPC .............. 417/63, 437, 471; 73/721, 700, 732
See application file for complete search history.

(56) References Cited

U.S. PATENT DOCUMENTS

| 5,113,695 | A  | * | 5/1992 | Huang | .................... | G01L 17/00 |
| | | | | | | 116/34 R |
| 6,318,969 | B1 | * | 11/2001 | Wang | ....................... | F04B 33/00 |
| | | | | | | 417/527 |
| 6,485,264 | B1 | * | 11/2002 | Wu | ....................... | F04B 33/005 |
| | | | | | | 417/63 |
| 6,676,390 | B2 | * | 1/2004 | Wang | ....................... | F04B 33/00 |
| | | | | | | 417/468 |
| 6,814,552 | B2 | * | 11/2004 | Wu | ....................... | F04B 33/005 |
| | | | | | | 137/228 |
| 7,331,768 | B2 | * | 2/2008 | Wu | ....................... | F04B 33/005 |
| | | | | | | 417/468 |
| 7,789,638 | B2 | * | 9/2010 | Chuang | ................. | F04B 33/005 |
| | | | | | | 417/429 |

FOREIGN PATENT DOCUMENTS

| CN | 2407152 Y | * | 11/2000 |
| CN | 2407152 Y | * | 11/2000 | ............. F04B 33/00 |
| TW | I304454 | | 12/2008 |
| TW | M410797 U | | 9/2011 |

OTHER PUBLICATIONS

Huang, Delong; Nov. 22, 2000; Air Pump with Pressure Meter; English Machine Translation of CN-2407152.*

* cited by examiner

*Primary Examiner* — Nathan J Newhouse
*Assistant Examiner* — Connor Tremarche
(74) *Attorney, Agent, or Firm* — Leong C. Lei

(57) ABSTRACT

An air pump that measures an air pressure including a base, a one-way valve, a pump pipe, a piezometer, a scale plate, a cylinder, a piston, and a driving stem. The base has a chamber room. The one-way valve has an inlet chamber and a vent. The scale plate has an air-guiding hole so that a cylinder hole of the cylinder is communicated with the air-guiding hole. A piston is driven to pump gas in the cylinder hole, thereby forcing the gas to enter the inlet chamber, rendering the vent to deliver the gas unidirectionally, and allowing the scale plate to display an air pressure value.

17 Claims, 23 Drawing Sheets

AIR PUMP FOR MEASURING AN AIR PRESSURE

BACKGROUND OF THE INVENTION

1. Field of the Invention

The present invention relates to an air pump with a scale plate integrally disposed on the top surface of the base of the pump tube, in particular to a scale plate for measuring the air pressure.

2. Description of the Related Art

The newest technique of disposing the variometer on the base of an air pump is disclosed by FIG. 1 of Taiwan patent number I304454 whose title is "An air pump capable of varying in three kinds of air pressure" and FIG. 1 of Taiwan Utility Innovation number M410797 whose title is "An air pump put on the ground".

However, the variometers of the prior patents have disadvantages as follows:

1. The conventional variometer is disposed at an outer side of the base, which renders the appearance of the product quite unusual, occupies the space and has difficulty in storing. Furthermore, it may easily cause harmful impact when carrying, so it is hard to achieve the demand of fine goods.

2. The conventional variometer is not adapted to a design with a bigger dimension since the problems of occupying the space and ease of carrying will become severe, which results in a variometer with a quite small scale that makes it difficult to clearly recognize the scale when read from a distance.

Therefore, in view of the disadvantages of the prior patents, the inventor has conceived, created and developed a more progressive invention.

SUMMARY OF THE INVENTION

The present invention provides an air pump for measuring an air pressure comprising:

A base including a chamber room;

A one-way valve disposed at an inner side of the base and including an inlet chamber and a vent;

A pump pipe including a pipe hole with one end thereof connecting to the vent and an air faucet disposed at the other end thereof;

A piezometer disposed in the chamber room for measuring an air pressure value of the vent;

A scale plate disposed at a top surface of the base for displaying an air pressure value of the piezometer; the scale plate further including an air-guiding hole communicating with the inlet chamber;

A cylinder erectly fixed on the scale plate and including a cylinder hole communicating with the air-guiding hole;

A piston slideably disposed in the cylinder hole; and

A driving stem applied to drive the piston to pump gas in the cylinder hole so that the gas is forced to enter the inlet chamber of the one-way valve via the air-guiding hole to allow the vent to deliver the gas to the pump pipe and the piezometer unidirectionally and render the scale plate able to display an air pressure value of the gas.

From the foregoing descriptions, the present invention at least includes the structures as follows:

1. The scale plate of the present invention is directly defined on the top surface of the base for directly displaying the air pressure value on the top surface of the base, which can improve the conventional conspicuous appearance and prevent the base from being too thick or too heavy, thereby attaining a high-value merit of fine goods.

2. The bottom side of the cylinder of the present invention is correspondingly fixed to the scale plate, and the scale plate is disposed at the top surface of the base, which allows the area of the scale plate to be closed to the area of the top surface of the base. Therefore, the area of the scale plate is much bigger than the conventional scale plate, which allows the scale to be clearly recognized when read from a distance.

DETAILED DESCRIPTION OF THE NON-LIMITING EMBODIMENTS

Figure 1:
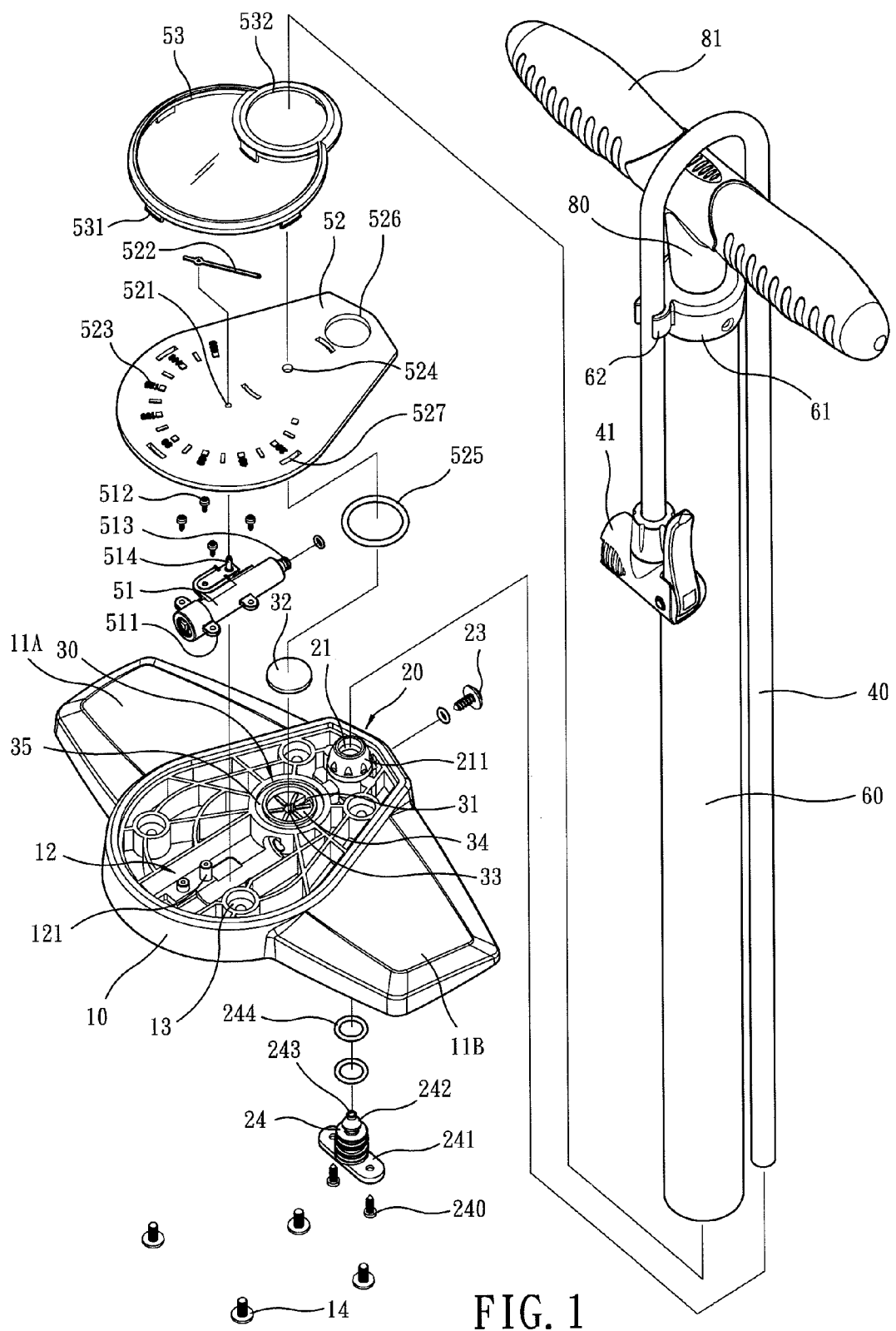
FIGS. 1 and 2 are exploded views showing a first non-limiting embodiment of the present invention.
Figure 2:
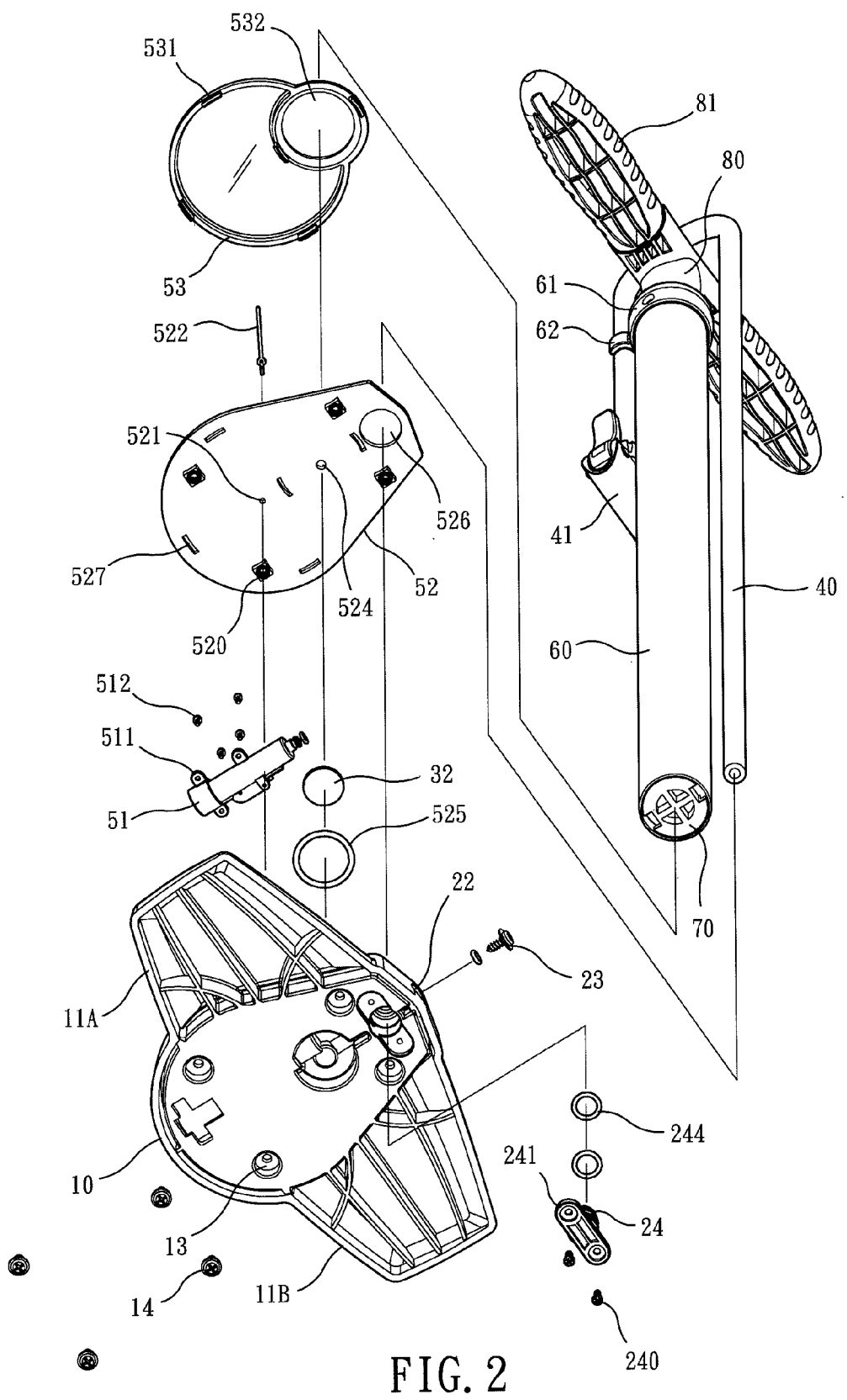
Figure 3:
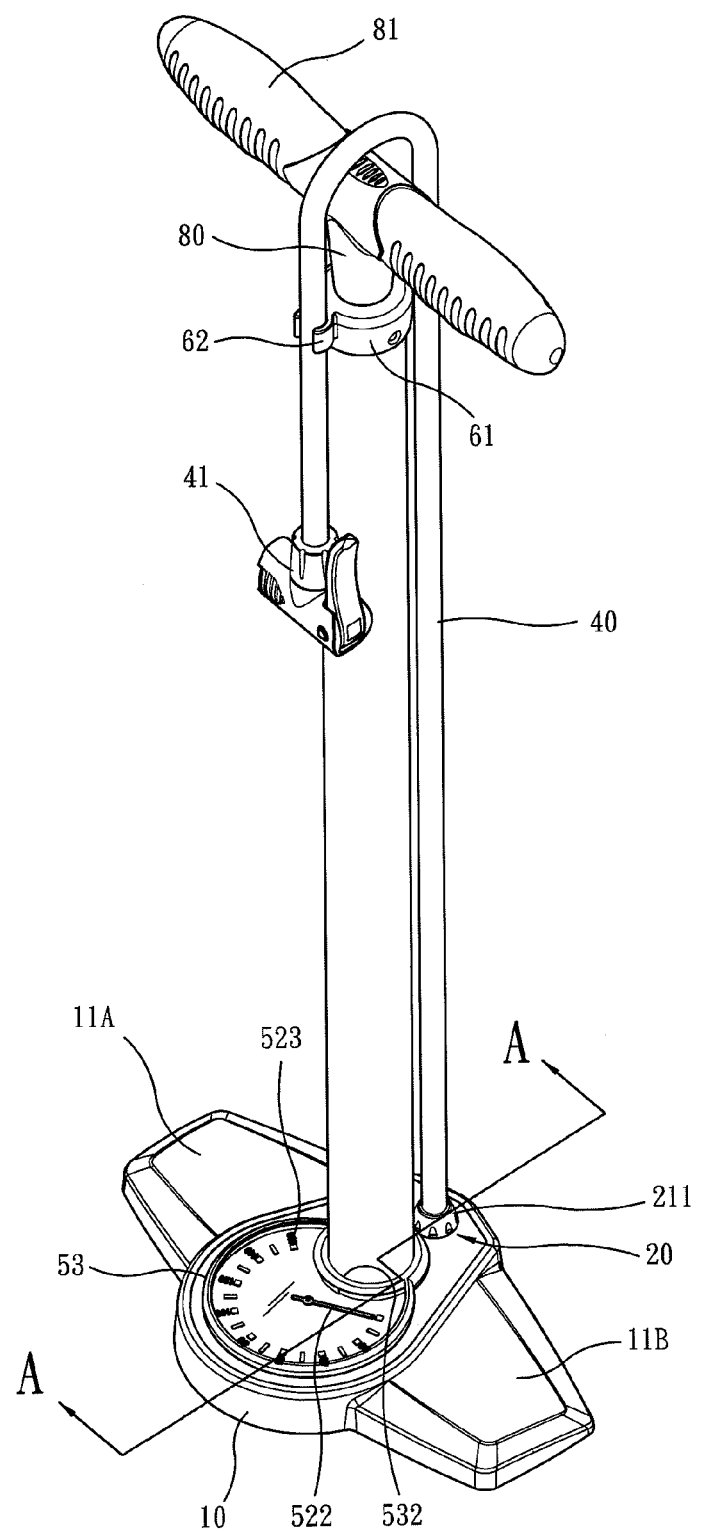
FIG. 3 is a schematic view showing the first non-limiting embodiment of the present invention when combining.

Before describing the invention in detail, it should be noted that like elements are denoted by similar reference numerals throughout the disclosure.

Referring to FIGS. 1 to 6, the present invention comprises:

A base 10 includes two pedals 11A, 11B symmetrically protruding at both sides thereof, and a chamber room 12 recessing downward from a top surface of the base 10. The inner side of the chamber room 12 includes a plurality of first base screws 121. Four second base screws 13 are disposed on the base 10. The second base screws 13 provide a second bolt 14 to penetrate through and position from the bottom to the top.

A pipe-joint section 20 is disposed at the front edge of the base 10, including a longitudinal hole 21, a joint hole 22, a fastener 23, and a joint 24. The longitudinal hole 21, formed by an upper section with a smaller diameter and a lower section with a larger diameter, penetrates through the base 10. A collar unit 211, protruding from the top surface of the base 10, is applied to define the upper section with a smaller diameter of the longitudinal hole 21, and the joint hole 22 is horizontally recessed from the front edge of the base 10, so that the joint hole 22 penetrates through the lower section with a larger diameter of the longitudinal hole 21 and is communicated with the chamber room 12. Moreover, the fastener 23 is applied to seal an outer part of the joint hole 22. The joint 24 is inserted in the longitudinal hole 21 from the bottom to the top, providing a wing section 241 extending from a bottom side thereof for being fastened on a bottom surface of the base 10 via a fixed bolt 240, a hook portion 242 is disposed at a top side thereof for stretching into a center of a collar unit 211, and a guiding hole 243 is concavely disposed at the top side of the hook portion 242 for being communicated with the joint hole 22. Two leakproof washers 244 are installed on the joint 24 to prevent leaking gas out of an engaged part of the longitudinal hole 21 and the joint hole 22.

A one-way valve 30 is disposed approximately at the center of the base 10, including an inlet chamber 31, an anti-reverse unit 32, a vent 33, and a sub-channel 34. The inlet chamber 31 is recessed downward from the top surface of the base 10 to provide enough space for the anti-reverse unit 32 to move upward and downward. The inlet chamber 31 includes a vent 33 defined at a bottom side thereof within a range of the anti-reverse unit 32. The vent 33 is communicated with the joint hole 22. Furthermore, a plurality of sub-channels 34 are concavely disposed at the bottom of the inlet chamber 31 for keeping the communication of the vent 33. The top surface of the base 10 includes a washer groove 35 concavely surrounded at the external border of the inlet chamber 31.

A pump pipe 40 is provided where a top side of the pump pipe 40 includes an air faucet 41 connecting to an un-inflated object, and a bottom side of the pump pipe 40 is inserted into the collar unit 211 and a hook portion 323 is tightly embedded into the pipe hole at the bottom of the pump pipe 40 so that the guiding hole 243 intermediately communicates with the pump pipe 40 and the joint hole 22.

A piezometer 51 for measuring the air pressure includes a wing section 511 matching to a first base screw 121, allowing a first bolt 512 to be screwed onto the first base screw 121 after the first bolt 512 penetrates through the wing section 511. Therefore, the piezometer 51 is fixedly disposed in the chamber room 12. The piezometer 51 includes a piezometric head 513 air-tightly aiming at the joint hole 22 and a linking structure for measuring the air pressure of the joint hole 22 disposed therein. The linking structure drives a shaft 514 to rotate by a relative angle depending on different air pressures.

A scale plate 52 correspondingly covers on the top surface of the base 10 to seal an opening of the inlet chamber 31 and the chamber room 12. The bottom surface of the scale plate 52 includes a nut portion 520 providing a second bolt 14 to screw thereon so that the scale plate 52 is integrally and fixedly fastened on the top surface of the base 10. A sealing washer 525 is disposed corresponding to the washer groove 35 in advance for preventing the inlet chamber 31 from leaking gas so that the sealing washer 525 air-tightly joints the bottom surface of the scale plate 52 via the screwing stress of the second bolt 14 to avoid gas leakage. The scale plate 52 provides a shaft hole 521 from which the shaft 514 protrudes. An indicator 522 is pivoted on a portion where the shaft 514 protrudes. A plurality of scales 523 are arranged on the scale plate 52 in order. Therefore, when the piezometer 51 measures the air pressure of the joint hole 22, the indicator 522 is driven to point to the corresponding scale 523 for displaying the air pressure value. The scale plate 52 includes an air-guiding hole 524 communicating with the inlet chamber 31 and a joint hole 526 providing the collar unit 211 to insert thereinto. Furthermore, a plurality of first buckled sections 527 are equidistantly disposed on the scale plate 52.

A shield 53, pervious to light, includes a second buckled section 531 matching to the first buckled section 527 for the shield 53 to fixedly cover on the top surface of the scale plate 52 so as to protect the indicator 522 and the scale 523. The shield 53 defines a bracket hole 532 with a diameter larger than a diameter of the air-guiding hole 524. The bracket hole 532 is communicated with the air-guiding hole 524.

A cylinder 60 has a bottom side thereof that is correspondingly inserted into the bracket hole 532 and erectly disposed on the scale plate 52 by welding or integrating. The inner side of the cylinder 60 includes a cylinder hole 64 penetrating therethrough. The cylinder hole 64 is communicated with the air-guiding hole 524. Furthermore, a cap 61 is disposed at the top side of the cylinder 60. A clamping seat 62 clamping the pump pipe 40 is disposed on the cap 61.

A piston 70 is air-tightly and slideably disposed in the cylinder hole 64.

Figure 4A:
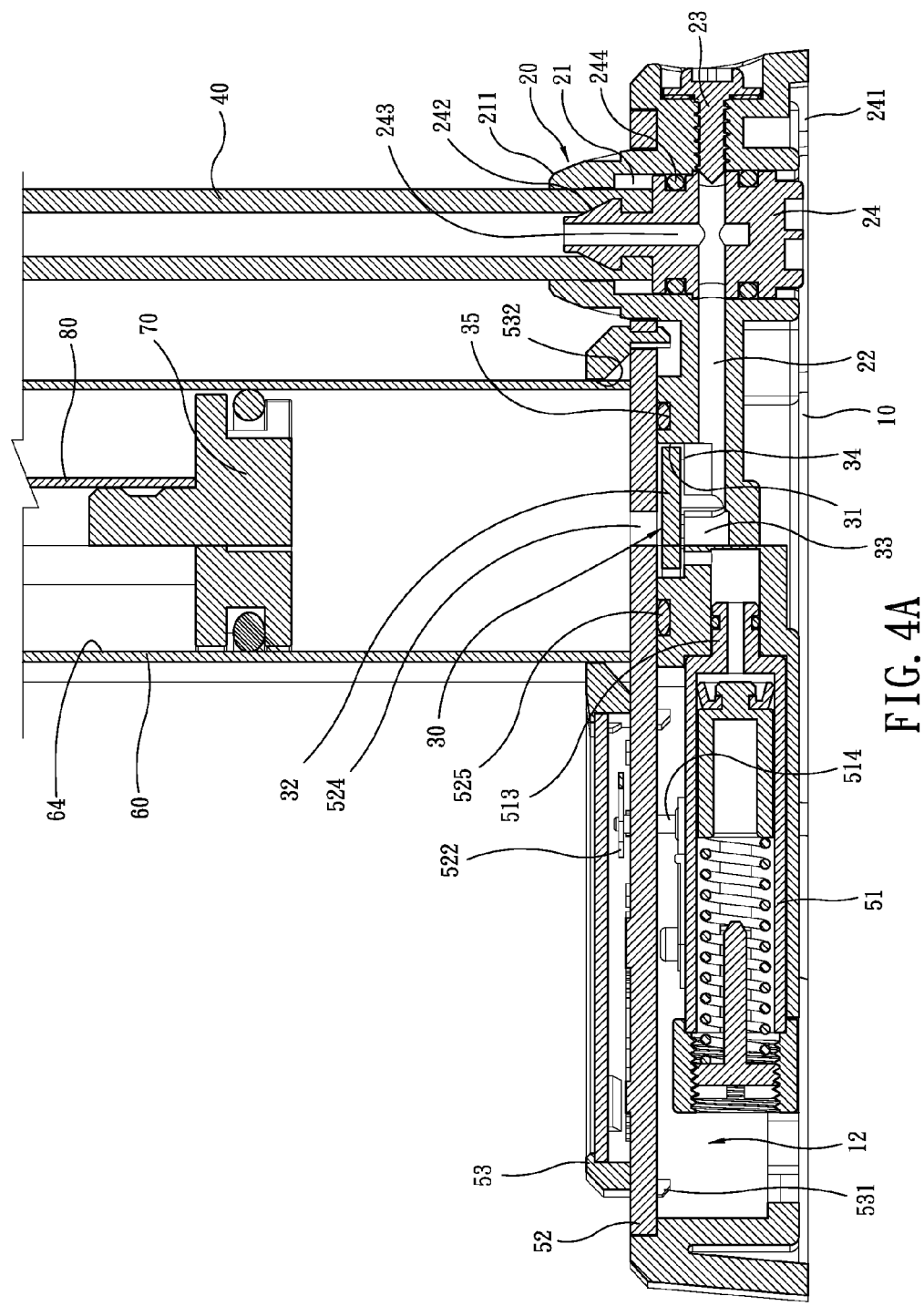
FIG. 4A is a cross-sectional view showing the A-A section in FIG. 3.
Figure 4B:
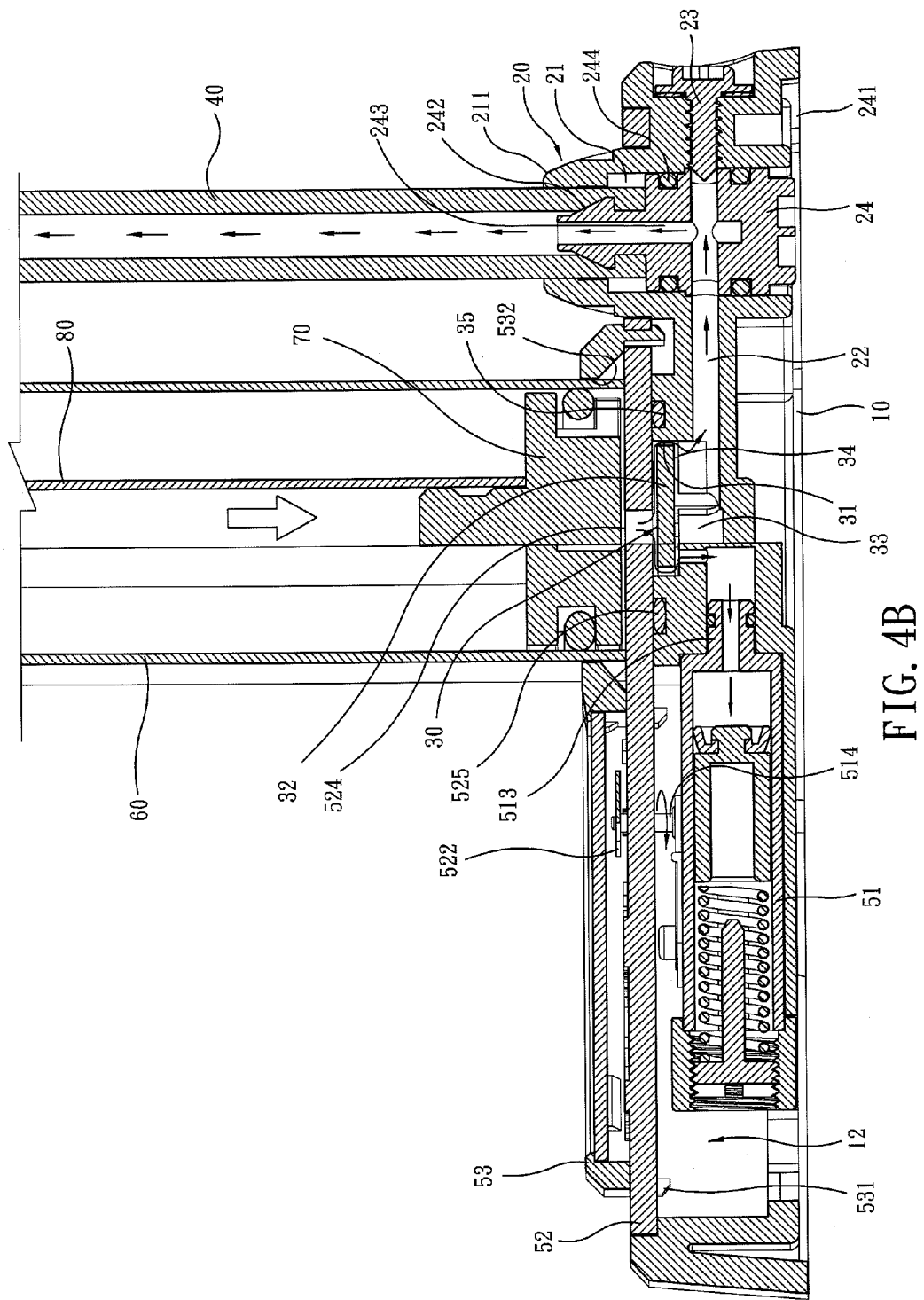
FIG. 4B is a flow-field view showing the sliding of the piston to the bottom dead center.
Figure 4C:
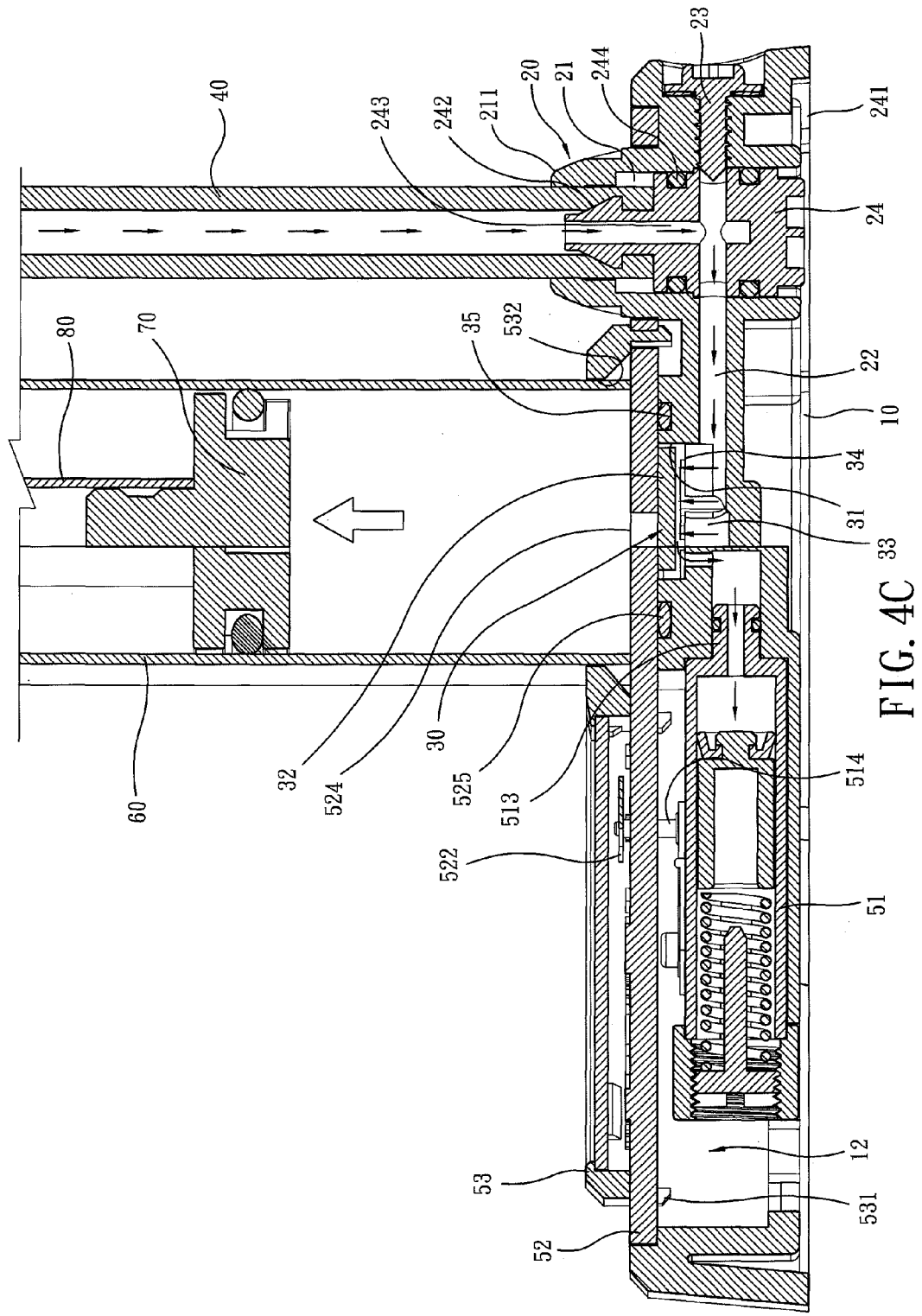
FIG. 4C is a flow-field view showing the sliding of the piston in an upward direction.
Figure 5:
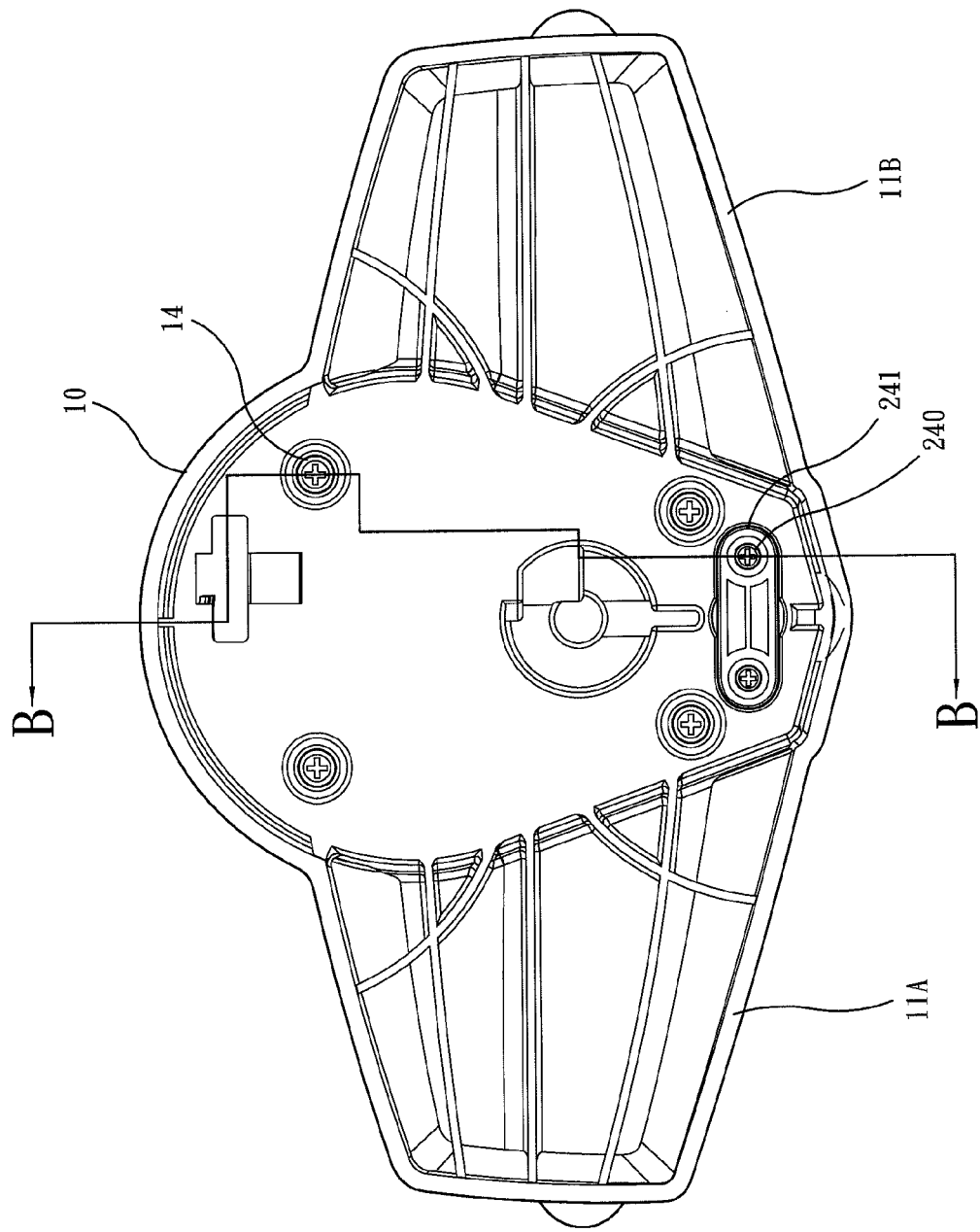
FIG. 5 is an upward view showing the first non-limiting embodiment of the present invention after combined.
Figure 6:
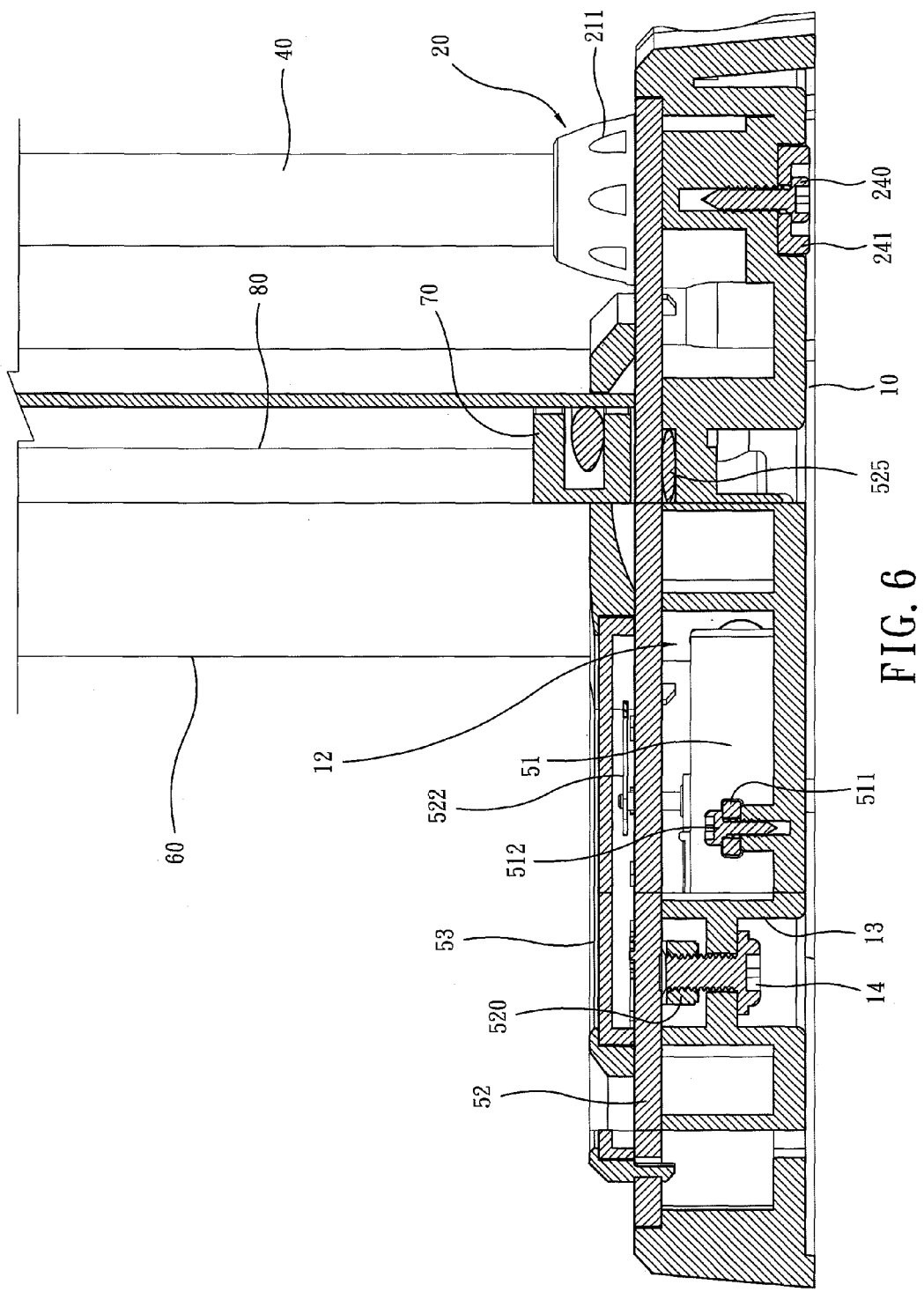
FIG. 6 is a cross-sectional view showing the B-B section in FIG. 5.
Figure 7:
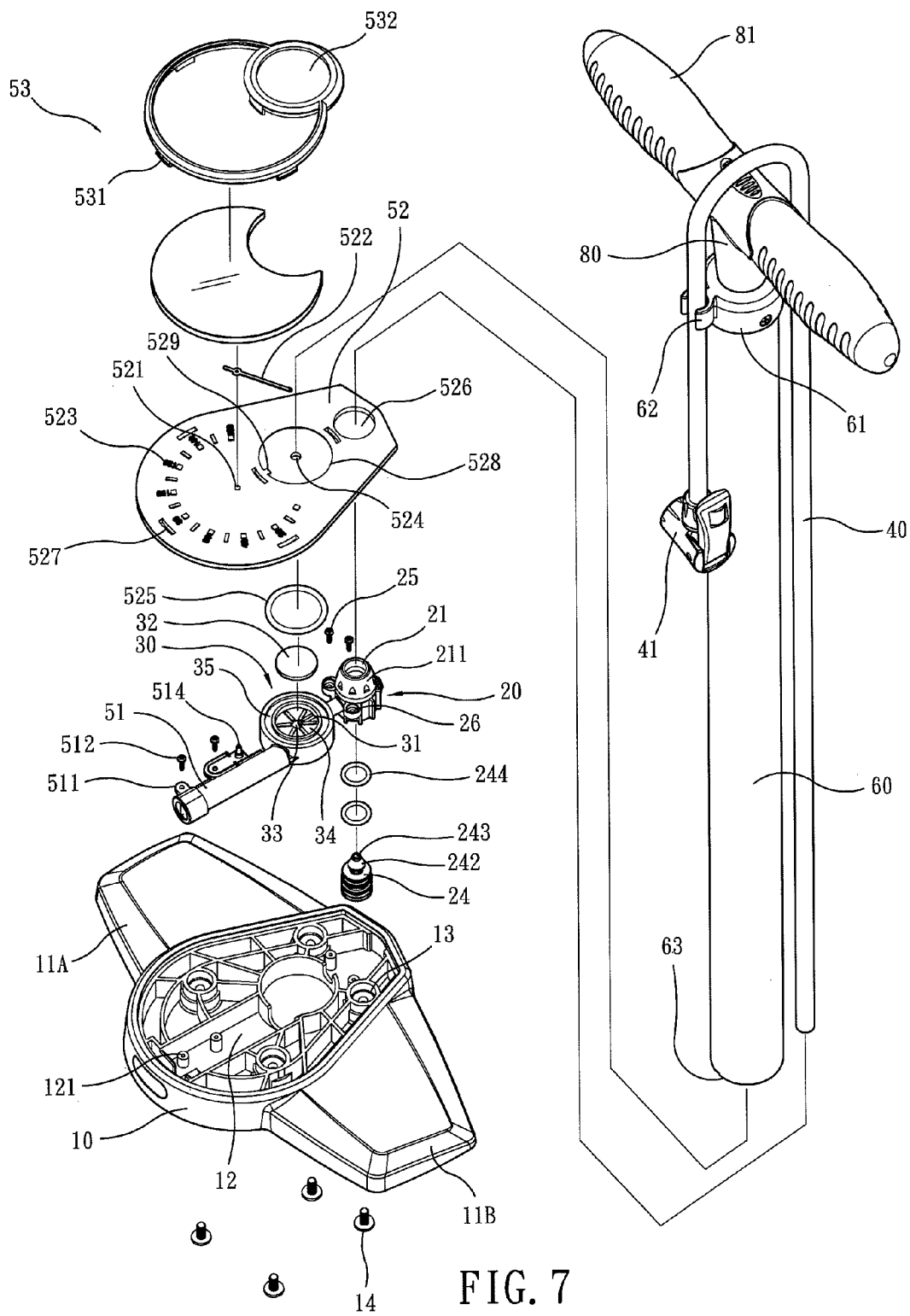
FIG. 7 is an exploded view showing a second non-limiting embodiment of the present invention.
Figure 8:
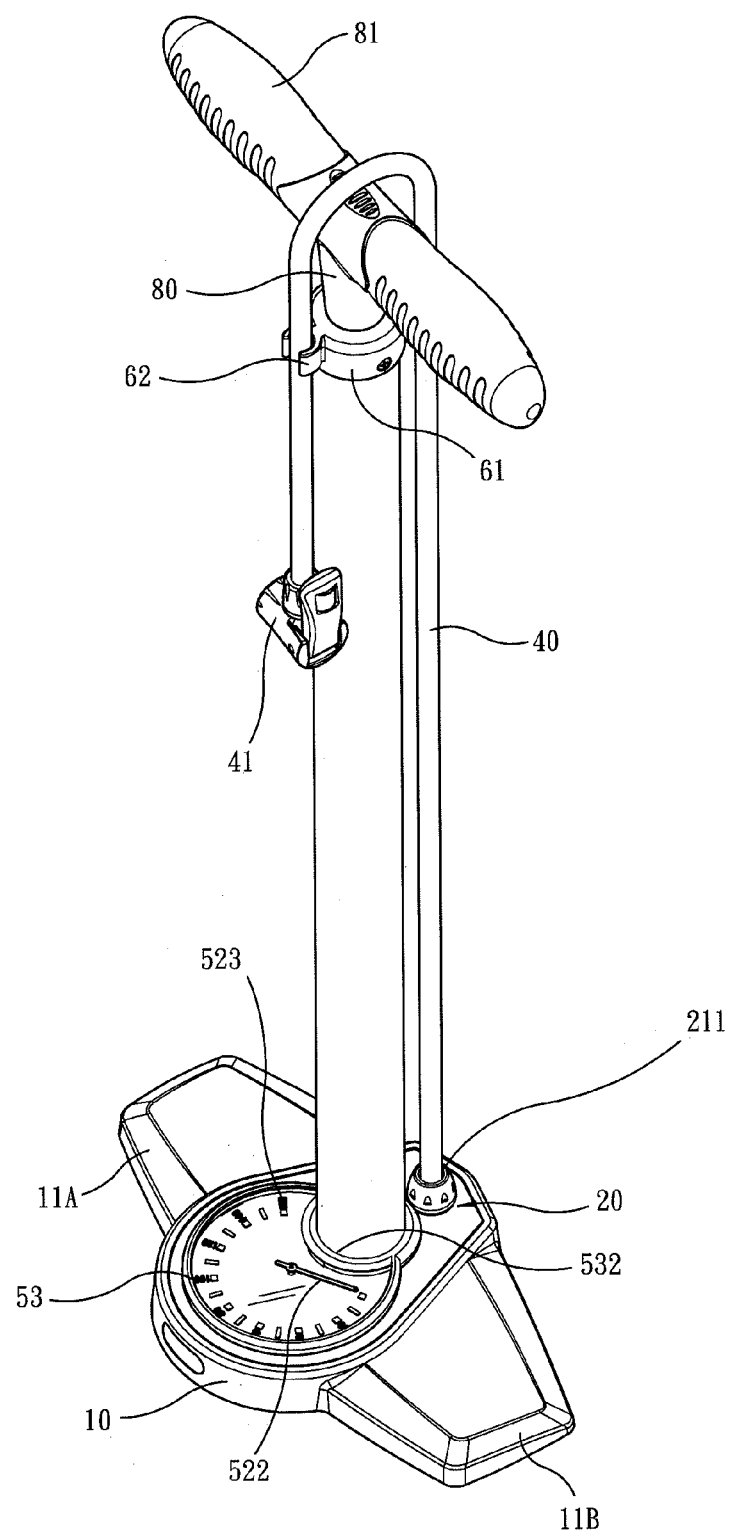
FIG. 8 is a schematic view showing the second non-limiting embodiment of the present invention when combining.
Figure 9:
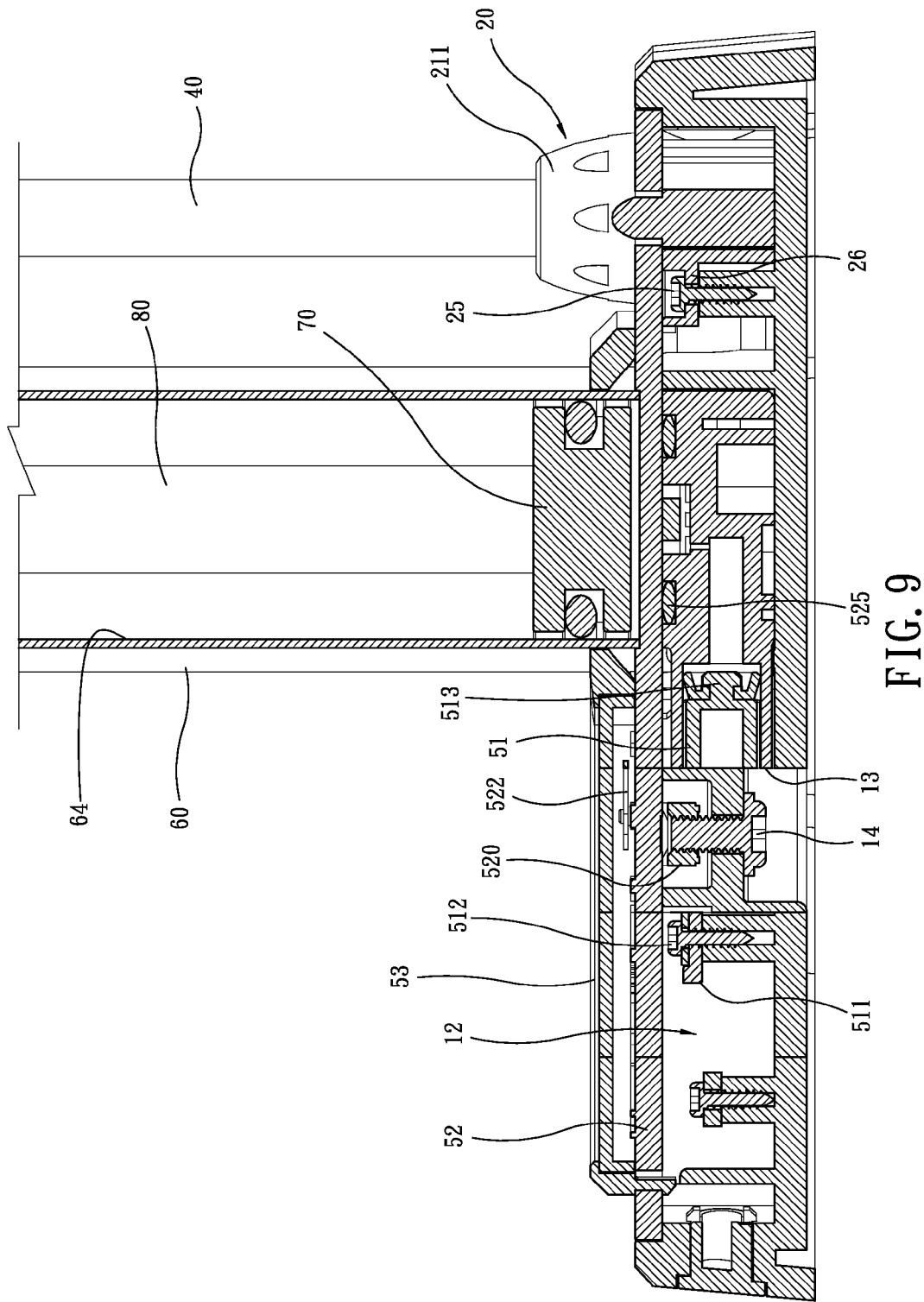
FIGS. 9 and 10 are the partly cross-sectional view showing the second non-limiting embodiment of the present invention when combining.
Figure 10:
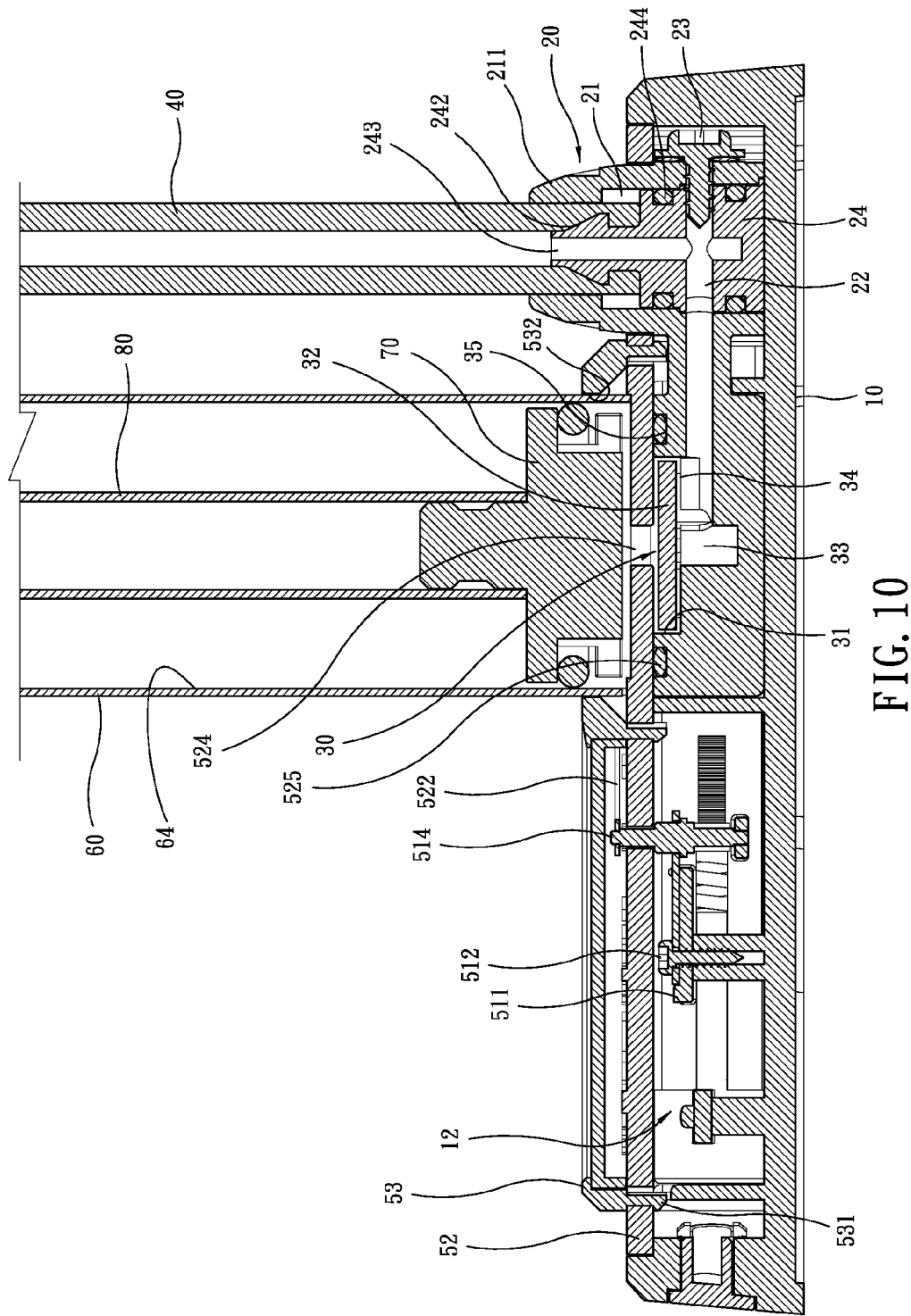
Figure 11:
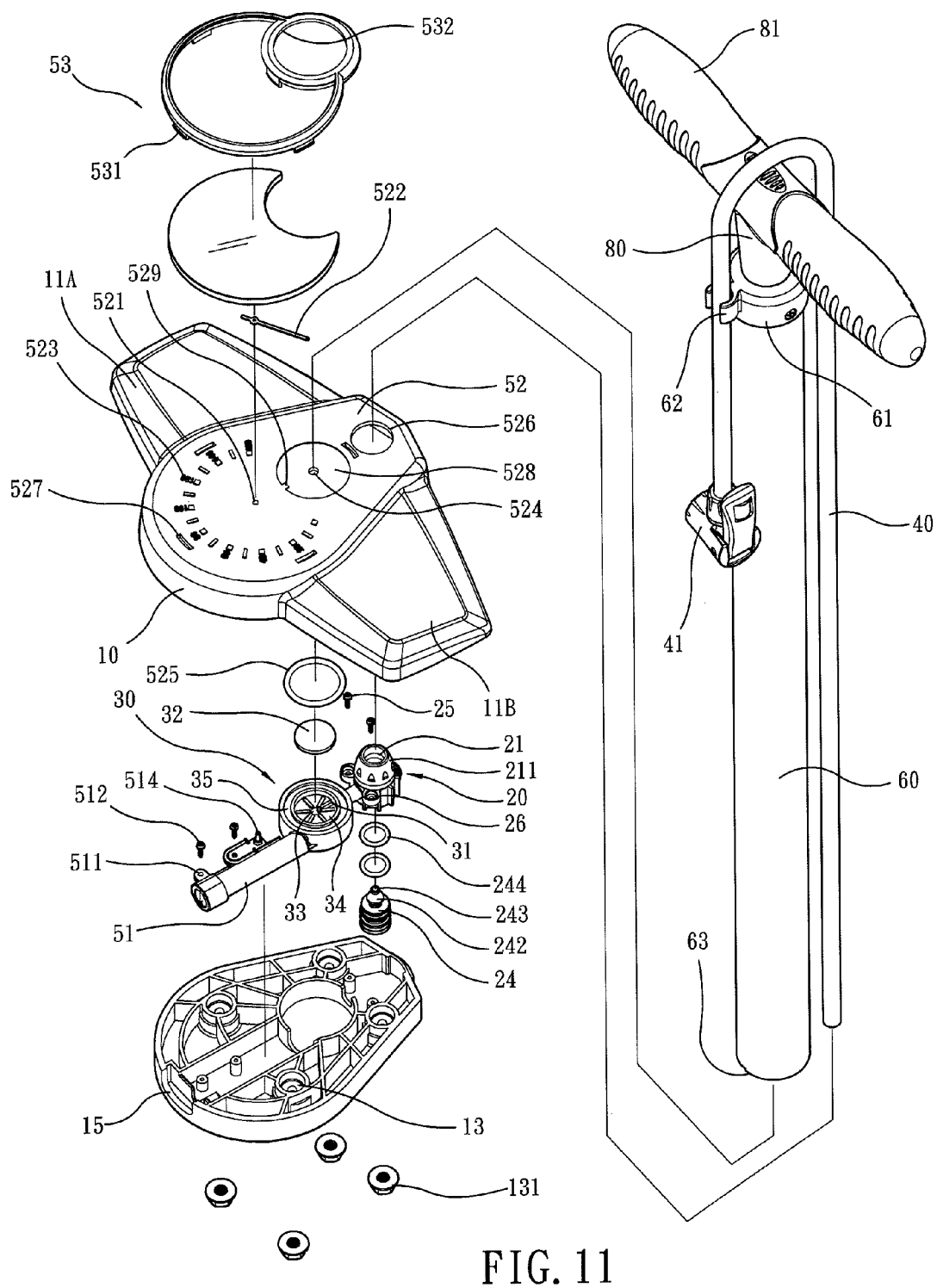
FIGS. 11 and 12 are exploded views showing a third non-limiting embodiment of the present invention.
Figure 12:
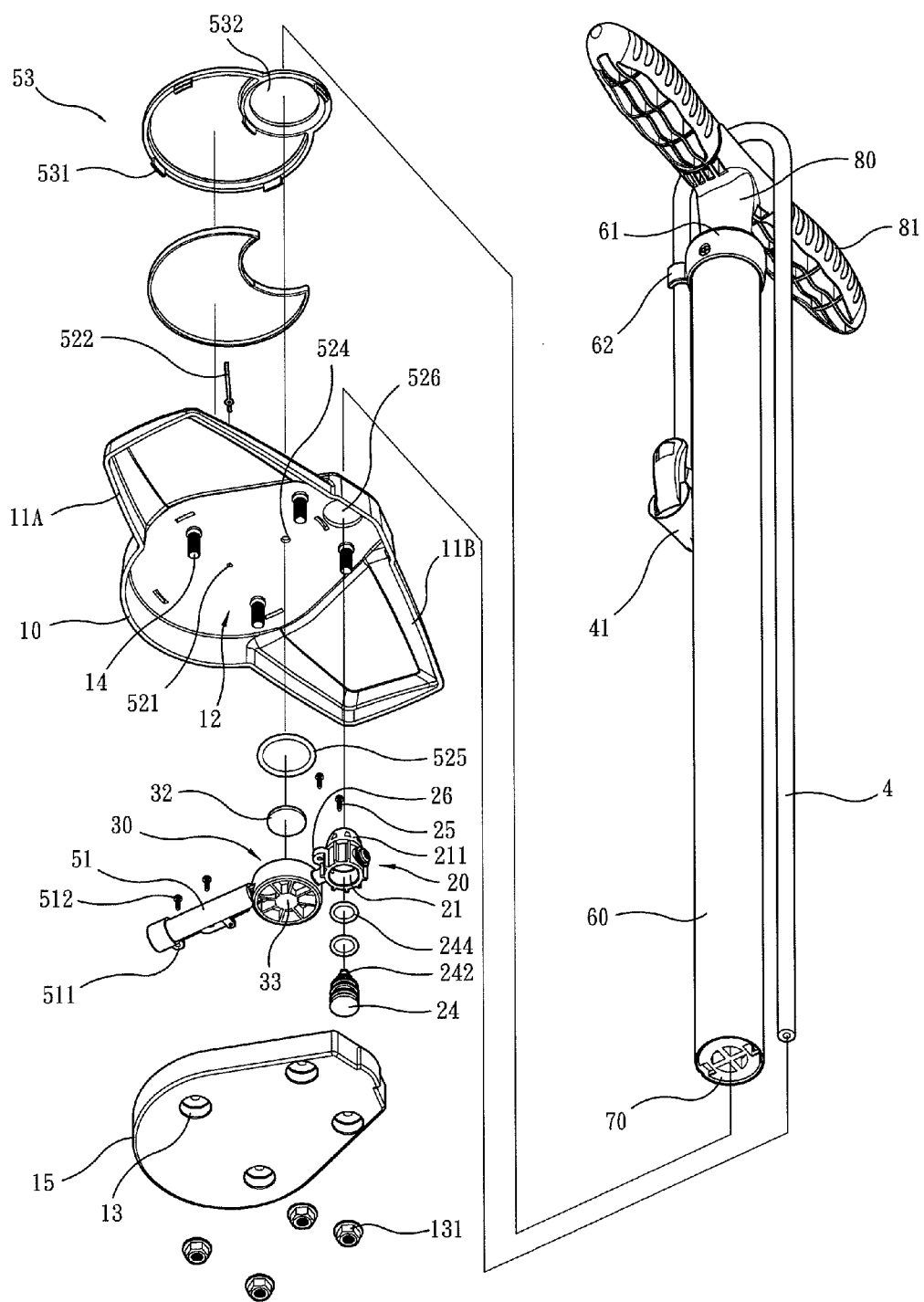
Figure 13:
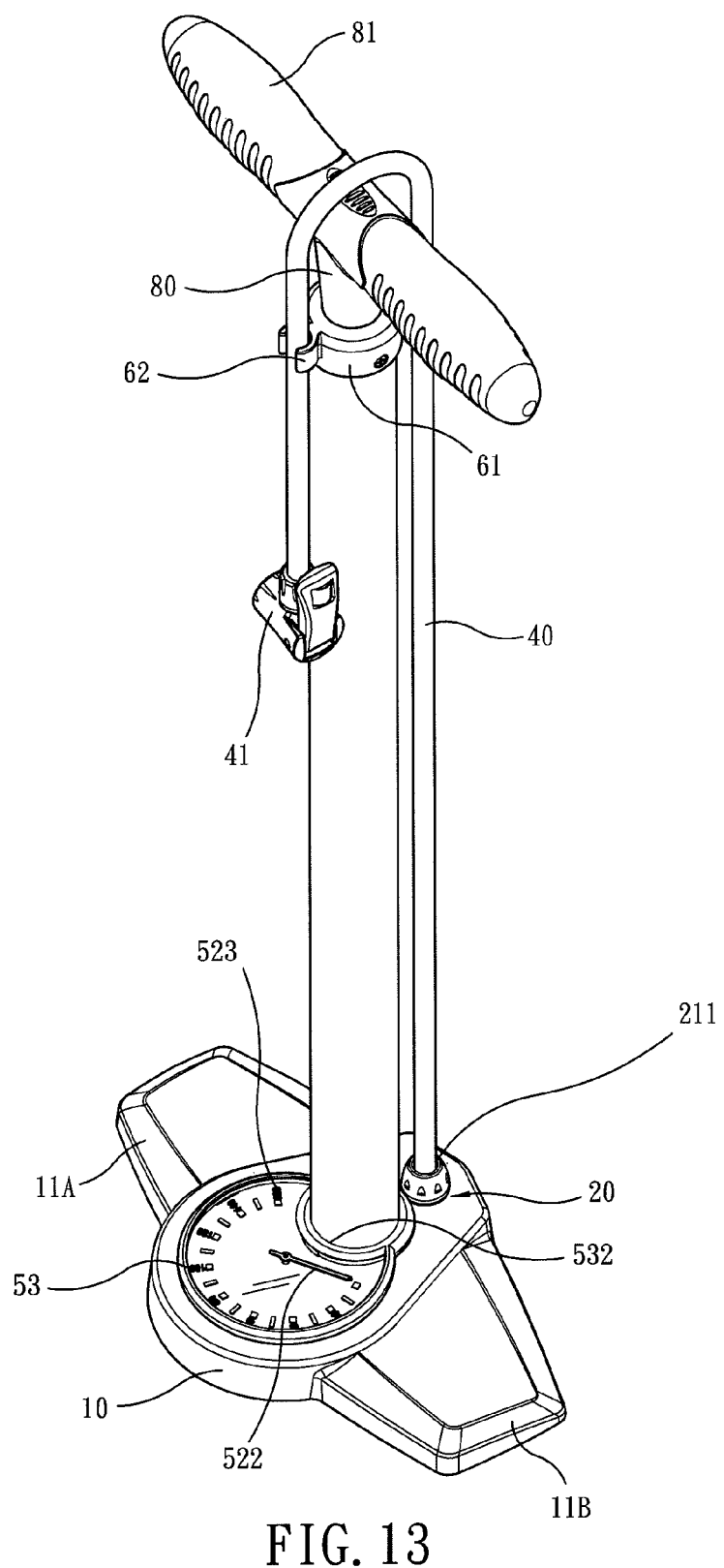
FIG. 13 is a schematic view showing the third non-limiting embodiment of the present invention when combining.
Figure 14:
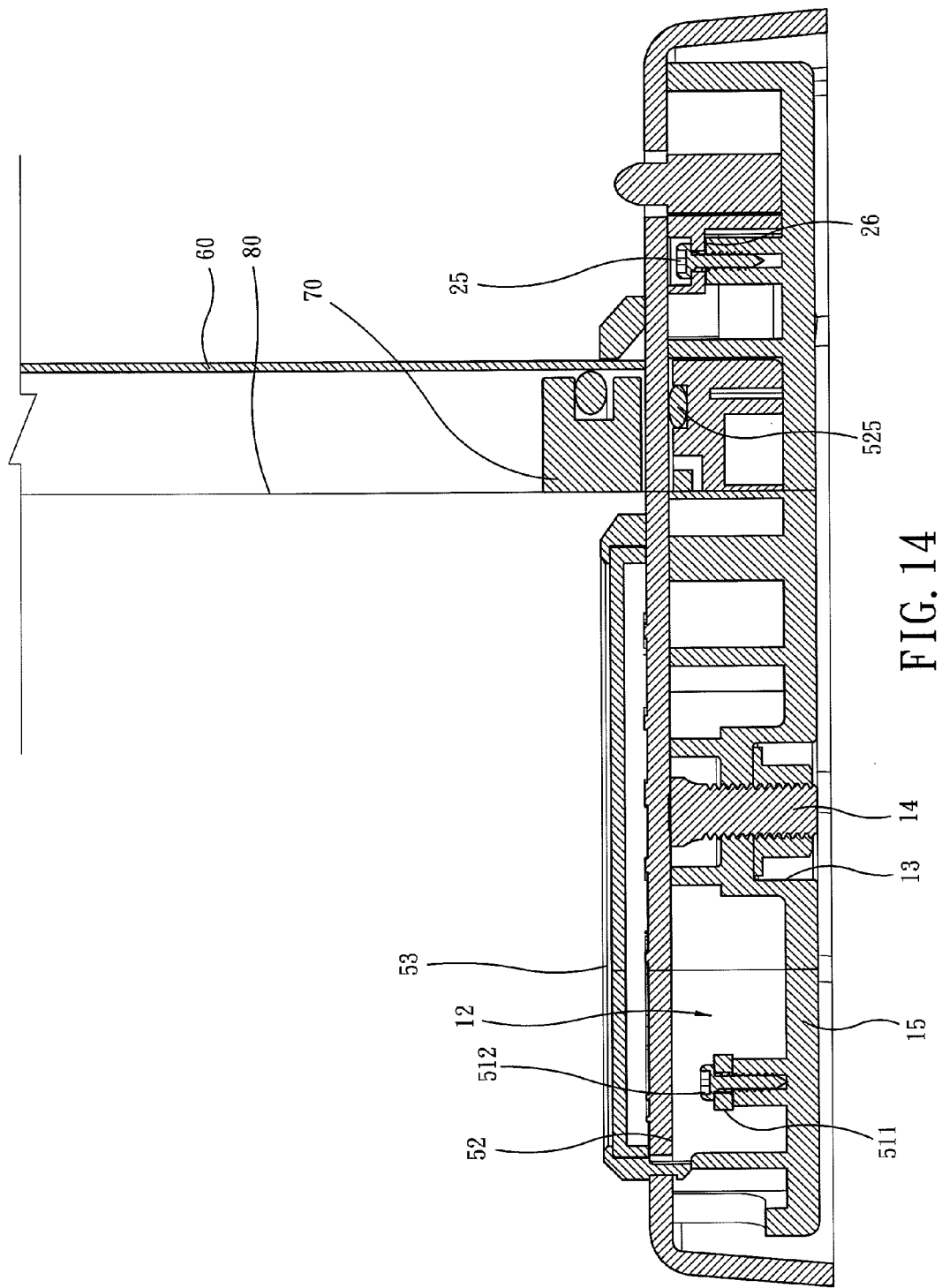
FIGS. 14 and 15 are the partly cross-sectional view showing the third non-limiting embodiment of the present invention when combining.
Figure 15:
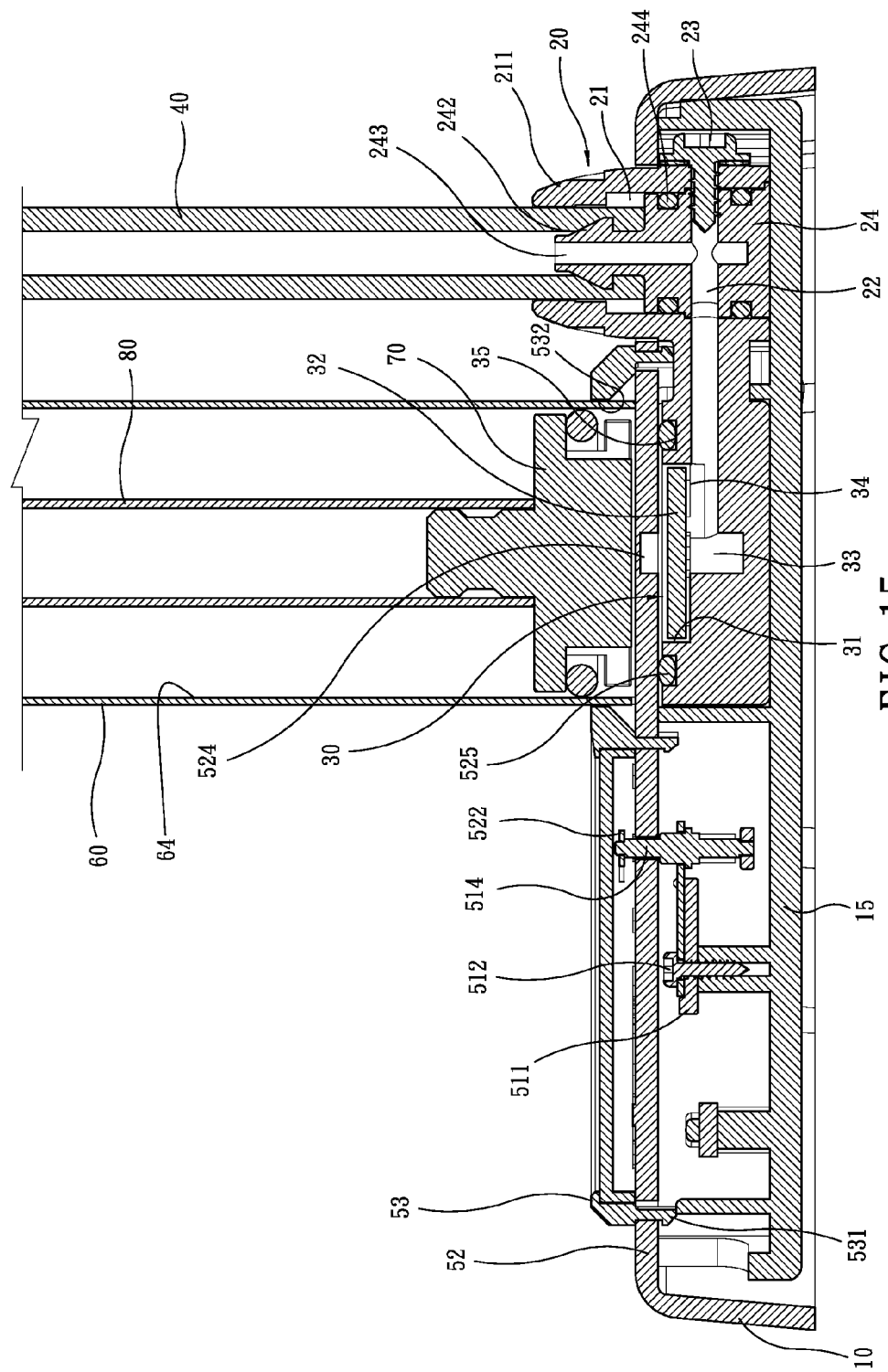

A driving stem 80 is provided and has a bottom side thereof that is connected to the piston 70, and a top side thereof that is disposed to penetrate or protrude from the cap 61. A handle 81 is disposed at the top side of the driving stem 80 so that the handle 81 drives the piston 70 to pump gas in the cylinder hole 64 back and forth. Referring to FIG. 4B, when the piston 70 moves downward to operate a positive pressure of the gas, the gas is forced to enter the inlet chamber 31 of the one-way valve 30 via the air-guiding hole 524 and output to the joint hole 22 through the sub-channel 34 and the vent 33 unidirectionally so that the gas is delivered to the pump pipe 40 for pumping up and the scale plate 52 is able to display the air pressure value of the inner joint hole 22. Referring to FIG. 4C, when the piston 70 moves upward to render the cylinder hole 64 to cause a negative pressure, the anti-reverse unit 32 of the one-way valve 30 moves upward and seals the air-guiding hole 524 so that the one-way valve 30 replenishes the cylinder hole 64 of the cylinder 60 with the external gas. (This part belongs to the conventional technique and herein is omitted)

Therefore, the present invention at least includes the progressive effects as follows:

(A) The piezometer 51 of the present invention is concealed in the chamber room 12 of the inner base 10. The scale plate 52 is integrally connected corresponding to the top surface of the base 10. Hence, the present invention improves the disadvantages of the conventional variometer which is disposed on the base unusually, and the problems of occupying the space and colliding easily. The combined thickness of the base 10 and the scale plate 52 of the present invention is still thin, so the present invention has a high-value merit of fine goods.

(B) The bottom side of the cylinder 60 of the present invention is directly fixed on the scale plate 52, so the scale plate 52 is enlarged to have the same dimension as the dimension of the base 10. The enlarged scale plate 52 renders the dimensions of the scale 523 and the indicator 522 to also be enlarged. To compare with the prior patent, the present invention allows people to be able to read clearly from a distance without bending the waist.

(C) The pipe-joint section 20 of the present invention provides a quick combination of the pump pipe 40.

Referring to the FIGS. 7 to 10, the pipe joint section 20 and the one-way valve 30 are defined to separate from the base 10, so the one-way valve 30 is intermediately connected to the pipe-joint section 20 and the piezometer 51 as a combination which is then disposed in the chamber room 12 of the base 11.

The pipe joint section 20 includes a longitudinal hole 21, a joint hole 22, a fastener 23, and a joint 24. The longitudinal hole 21 penetrates through the top surface and bottom surface of the base 10 and provides a smaller hole diameter defined at an upper section and a larger hole diameter defined at a lower section. A collar unit 211 is applied to define the upper section with the smaller diameter of the longitudinal hole 21, and the joint hole 22 radially penetrates through the lower section of the longitudinal hole 21. The fastener 23 is applied to seal one end of the joint hole 22. The joint 24 is inserted into the longitudinal hole 21 from the bottom to the top. A third base screw 26 is disposed at the external border of the pipe-joint section 20. The third base screw 26 provides the third bolt 25 to penetrate from the top to the bottom and be fastened on the base 10 so that the pipe joint section 20 and the bottom side of the joint 24 are fixed on the chamber room 12. The top edge of the joint 24 includes a hook portion 242 stretching into the center of the collar unit 211 and a guiding hole 243 concavely defined on a top side of the hook portion 242 for being communicated with the joint hole 22. A leakproof washer 244 is installed on the joint to prevent gas from leaking out of an engaged part of the longitudinal hole 21 and the joint hole 22.

A one-way valve 30 includes an inlet chamber 31, an anti-reverse unit 32, a vent 33, and a sub-channel 34. The inlet chamber 31 is recessed downward from the top surface of the one-way valve 30 to provide the anti-reverse unit 32 enough space to move upward and downward. The inlet chamber 31 includes a vent 33 defined at a bottom side thereof within a range of the anti-reverse unit 32. The vent 33 is communicated with a free end of the joint hole 22. Moreover, the sub-channel 34 communicating with the vent 33 is concavely disposed at the bottom side of the inlet chamber 31, and a washer groove 35 concavely surrounds the external border of the inlet chamber 31.

The bottom side of the pump pipe 40 is inserted into the collar unit 211 and the hook portion 242 is tightly embedded into the pipe hole of a bottom side of the pump pipe 40 so that the guiding hole 243 is intermediately communicated with the pump pipe 40 and the joint hole 22.

The piezometer 51 is fastened on the first base screw 121 via the first bolt 512 so as to fix the piezometer 51 in the chamber room 12. The piezometer 51 includes a piezometric head 513 air-tightly aiming at the joint hole 22 and a linking structure for measuring the air pressure of the joint hole 22 disposed therein. The linking structure drives a shaft 514 to rotate by a relative angle depending on different air pressures.

A scale plate 52 is correspondingly covered on the top surface of the base 10 and applied to seal the top side of the inlet chamber 31 and the chamber room 12. The bottom surface of the scale plate 52 includes a nut portion 520 providing the second bolt 14 to screw thereon so that the scale plate 52 is integrally fastened on the top surface of the base 10. A sealing washer 525 is disposed corresponding to the washer groove 35 in advance for preventing the inlet chamber 31 from leaking gas so that the sealing washer 525 air-tightly joints the bottom surface of the scale plate 52 via the screwing stress of the second bolt 14 to avoid gas leakage. The scale plate 52 provides a shaft hole 521 from which the shaft 514 protrudes. An indicator 522 is pivoted on a portion where the shaft 514 protrudes. A plurality of scales 523 are arranged on the scale plate 52 in order. Therefore, when the piezometer 51 measures the air pressure of the joint hole 22, the indicator 522 is driven to point to the corresponded scale 523 for displaying the air pressure value. The scale plate 52 includes an air-guiding hole 524 communicating with the inlet chamber 31 and a joint hole 526 providing the collar unit 211 to insert thereinto. Furthermore, the scale plate 52 includes a plurality of first buckled sections 527 equidistantly disposed thereon and an alignment section 528 with a diameter larger than the diameter of the air-guiding hole 524 concavely disposed on the top surface. The alignment section 528 is communicated with the air-guiding hole 524, and an insert block 529 is protruded on the border thereof.

A shield 53 includes a second buckled section 531 matching to the first buckled section 527 so that the shield 53 is fixedly covered on the top surface of the scale plate 52 to protect the indicator 522 and the scale 523. The shield 53 defines a bracket hole 532 with a diameter larger than the diameter of the air-guiding hole 524. The bracket hole 532 penetrates to connect to the air-guiding hole 524.

The bottom side of the cylinder 60 is correspondingly inserted into the bracket hole 532 and the alignment section 528, and an insert groove 63 matching to the insert block 529 is disposed thereon so that the cylinder 60 is disposed upright on the scale plate 52. The inner side of the cylinder 60 includes a cylinder hole 64 penetrated therethrough. The cylinder hole 64 is communicated with the air-guiding hole 524, in which a piston 70 is slideably disposed. The top side of the piston 70 is connected in-line to a driving stem 80, thereby driving the piston 70 to pump gas in the cylinder hole back and forth for the pump pipe 40 to pump up.

Referring to FIGS. 11 to 15, the third non-limiting embodiment of the present invention comprises:

A base 10 that includes two pedals 11A, 11B symmetrically protruding at both sides thereof, and a chamber room 12 recessed upward from a bottom surface of the base 10. A second bolt 14 is disposed at the inner side of the chamber room 12. A bottom cover 15 covers the bottom side of the chamber room 12 on the base 10. A second base screw 13 matching to the second bolt 14 is disposed on the bottom cover 15 so that the bottom cover 15 is fastened on the bottom side of the base 10 by the nut 131.

A pipe joint section 20 is disposed in the chamber room 12 and includes a longitudinal hole 21, a joint hole 22, a fastener 23, and a joint 24. The longitudinal hole 21, formed by an upper section with a smaller diameter and a lower section with a larger diameter, penetrates through the top surface and bottom surface of the base 10. A collar unit 211 is applied to define the upper section with a smaller diameter of the longitudinal hole 21, and the joint hole 22 radially penetrates through the lower section of the longitudinal hole 21. The fastener 23 is applied to seal one side of the joint hole 22, and the joint 24 is inserted in the longitudinal hole 21 from the bottom to the top. A third base screw 26 is disposed at the external border of the pipe-joint section 20. The third base screw 26 provides the third bolt 25 to penetrate through from the top to the bottom, thereby screwing on the bottom cover 15, so that the pipe joint section 20 and the bottom side of the joint 24 are fastened on the bottom cover 15. The top edge of the joint 24 includes a hook portion 242 stretching into the collar unit 211 and a guiding hole 243 communicating with the joint hole 22 concavely defined at a top side of the hook portion 242. A leakproof washer 244 is further installed at the external border of the joint 24 to prevent gas from out of an engaged part of the longitudinal hole 21 and the joint hole 22.

A one-way valve 30 is disposed in the chamber room 12 and includes an inlet chamber 31, an anti-reverse unit 32, a vent 33, and a sub-channel 34. The inlet chamber 31 is recessed downward from the top surface of the one-way valve 30 to provide the anti-reverse unit 32 enough space to move upward and downward. The inlet chamber 31 further includes a vent 33 defined at a bottom side thereof within a range of the anti-reverse unit 32. The vent 33 is communicated to a free end of the joint hole 22. Furthermore, a sub-channel 34 is concavely disposed at the bottom side of the inlet chamber 31 for keeping the communication of the vent 33, and a washer groove 35 concavely surrounds the top side of the inlet chamber 31.

A pump pipe 40, the bottom side thereof is inserted into the collar unit 211 and the hook portion 242 is tightly embedded into the pipe hole at the bottom side of the pump pipe 40 for the guiding hole 243 to intermediately communicate the pipe hole of the pump pipe 40 with the joint hole 22.

A piezometer 51 is screwed on the bottom cover 15 by the first bolt 512, thereby fastening the piezometer 51 in the chamber room 12. The piezometer 51 includes a piezometric head air-tightly aiming at a free end of the joint hole 22 and a linking structure for measuring the air pressure of the joint hole 22 disposed therein. The linking structure drives a shaft 514 to rotate by a relative angle depending on different air pressures.

A scale plate 52 is directly formed at the top surface of the base 10. A sealing washer 525 is disposed corresponding to the washer groove 35 in advance for preventing the inlet chamber 31 from leaking gas. The scale plate 52 provides a shaft hole 521 from which the shaft 514 protrudes. An indicator 522 is pivoted on a portion where the shaft 514 protrudes. A plurality of scales 523 are arranged on the scale plate 52 in order. Therefore, when the piezometer 51 measures the air pressure of the joint hole 22, the indicator 522 is driven to point to the corresponded scale 523 for displaying the air pressure value. The scale plate 52 includes an air-guiding hole 524 communicating with the inlet chamber 31 and a joint hole 526 providing the collar unit 211 to insert thereinto. Furthermore, the scale plate 52 includes a plurality of first buckled sections 527 equidistantly disposed thereon and an alignment 528 with a diameter larger than a diameter of the air-guiding hole 524 concavely disposed on the top surface thereof. The alignment 528 is communicated with the air-guiding hole 524, and an insert block 529 is protruded at the border thereof.

A shield 53, pervious to light, includes a second buckled section 531 matching to the first buckled section 527 for the shield 53 to fixedly cover on the top surface of the scale plate 52 so as to protect the indicator 522 and the scale 523. A bracket hole 532 matching to the alignment section 528 is further defined on the shield 53.

A cylinder 60 is provided where the bottom side thereof is correspondingly inserted into the bracket hole 532 and the alignment 528, and an insert groove 63 matching to the insert block 529 is disposed thereof so that the cylinder 60 is disposed upright on the scale plate 52. The inner side of the cylinder 60 includes a cylinder hole 64 penetrated therethrough. The cylinder hole 64 is communicated with the air-guiding hole 524.

A piston 70 is slideably disposed in the cylinder hole 64.

A driving stem 80 is provided, the bottom side thereof connects to the piston 70 and renders the driving stem 80 to drive the piston 70 to pump gas in the cylinder hole 64 back and forth and deliver the gas to the pump pipe 40 for pumping up.

Referring to FIGS. 16 to 20, the fourth non-limiting embodiment of the present invention comprises:

A base 10 that includes two pedals 11A, 11B symmetrically protruding at both sides thereof, and a chamber room 12 recessed upward from a bottom surface of the base 10 so as to form a top cover 16 at the top surface of the base 10 and a bottom cover 15 sealed at the bottom side of the chamber room 12. The top cover 16 includes a second through-hole 161 and a second shaft hole 162 respectively penetrated therethrough, an auxiliary buckled section 163 defined by taking the second shaft hole 162 as a center, and a sleeve 17 integrally and upward stretched between the through-hole 161 and the second shaft hole 162. The sleeve 17 defines a sleeve hole 171 with an upward opening and a screwed section 172 disposed at the external border thereof.

The screwed section 172 provides a collar screwing unit 18 to screw, thereby making the sleeve hole 171 forced radially. The inner sleeve hole 171 symmetrically includes a pillar 173 with a diameter smaller than the sleeve hole 171. The pillar 173 includes an air-guiding hole 164 penetrated therethrough. The bottom surface of the top cover 16 includes a spacer 123 disposed under the pillar 173. The spacer 123 includes a washer hole 1230 engaged with the bottom side of the air-guiding hole 164.

A pipe-joint section 20 screwed on the bottom surface of the top cover 16 for disposing in the chamber room 12 includes a longitudinal hole 21, a joint hole, a fastener 23, and a joint 24. The longitudinal hole 21 penetrates through the pipe joint section 20 and provides a smaller hole diameter defined at an upper section and a larger hole diameter defined at a lower section. A collar unit 211 is applied to define the upper section with the smaller diameter of the longitudinal hole 21. The collar unit 211 corresponds to the second through-hole 161. The joint hole 22 radially penetrates through the lower section with a larger diameter of the longitudinal hole 21. A fastener 23 is applied to seal one side of the joint hole 22. The joint 24 is aimed in the longitudinal hole 21. The top edge of the joint 24 includes a hook portion 242 stretching into the collar unit 211 and a guiding hole 243 concavely defined on the top side of the hook portion 242 for communicating with the joint hole 22. A leakproof washer 244 is further installed on the external border of the joint 24 to prevent gas from leaking out of an engaged part of the longitudinal hole 21 and the joint hole 22.

A one-way valve 30 disposed in the chamber room 12 includes an inlet chamber 31, an anti-reverse unit 32, a vent 33, and a sub-channel 34. The inlet chamber 31 is recessed downward from the top surface of the one-way valve 30 to provide the anti-reverse unit 32 enough space to move upward and downward. The top side of the inlet chamber 31 is communicated with the washer hole 1230, and the bottom side of the inlet chamber 31 includes a vent 33 defined within a range of the anti-reverse unit 32. The vent 33 is communicated with a free end of the joint hole 22. Furthermore, a sub-channel 34 is concavely disposed at the bottom side of the inlet chamber 31 for keeping the communication of the vent 33, and a washer groove 35 concavely surrounds the top side of the inlet chamber 31.

A pump pipe 40, the bottom side thereof is inserted into the collar unit 211 and the hook portion 242 is tightly embedded into the pipe hole at the bottom side of the pump pipe 40 for the guiding hole 243 to intermediately communicate the pipe hole of the pump pipe 40 with the joint hole 22.

A piezometer 51 is screwed on the bottom surface of the top cover 16 and disposed in the chamber room 12. The piezometer 51 includes a piezometric head air-tightly aiming at a free end of the joint hole 22 and a linking structure for measuring the air pressure of the joint hole 22 disposed therein. The linking structure drives a shaft 514 to rotate by a relative angle depending on different air pressures.

A scale plate 52 is disposed on the top surface of the top cover 16, and a sealing washer 525 is disposed at a position corresponding to the washer groove 35. The scale plate 52 provides a shaft hole from which the shaft protrudes. An indicator 522 is pivoted on a portion where the shaft 514 protrudes. A plurality of different scales 523 are arranged on the scale plate 52. Therefore, when the piezometer 51 measures the air pressure of the joint hole 22, the indicator 522 is driven to point to the corresponded scale 523 for displaying the air pressure value. The scale plate 52 further includes a combining section 528 for an insertion of the sleeve 17 and a through-hole 526 for an insertion of the collar unit 211. Furthermore, a first buckled section 527 matching to the auxiliary buckled section 163 is disposed on the scale plate 52.

A shield 53, pervious to light, includes a second buckled section 531 matching to the first buckled section 527 and the auxiliary buckled section 163 for the shield 53 to fixedly cover on the top surface of the scale plate 52 so as to protect the indicator 522 and the scale 523. The shield 53 further defines a bracket hole 532 matching to the alignment section 528.

A cylinder 60 is provided, the bottom side thereof is fixedly and correspondingly inserted between the sleeve hole 171 and the pillar 173. By the screwing of the collar screwing unit 18, the bottom side of the cylinder 60 is clamped between the sleeve hole 171 and the pillar 173, whereby the cylinder 60 is disposed upright on the top surface of the top cover 16. The inner side of the cylinder 60 includes a cylinder hole 64 penetrated therethrough. The cylinder hole 64 is communicated with the air-guiding hole 164.

A piston 70 is air-tightly and slideably disposed in the cylinder hole 64.

A driving stem 80 is provided, the bottom side thereof is connected to the piston 70, and is applied to drive the piston 70 to pump gas in the cylinder hole back and forth for the pump pipe 40 to pump up.

Figure 16:
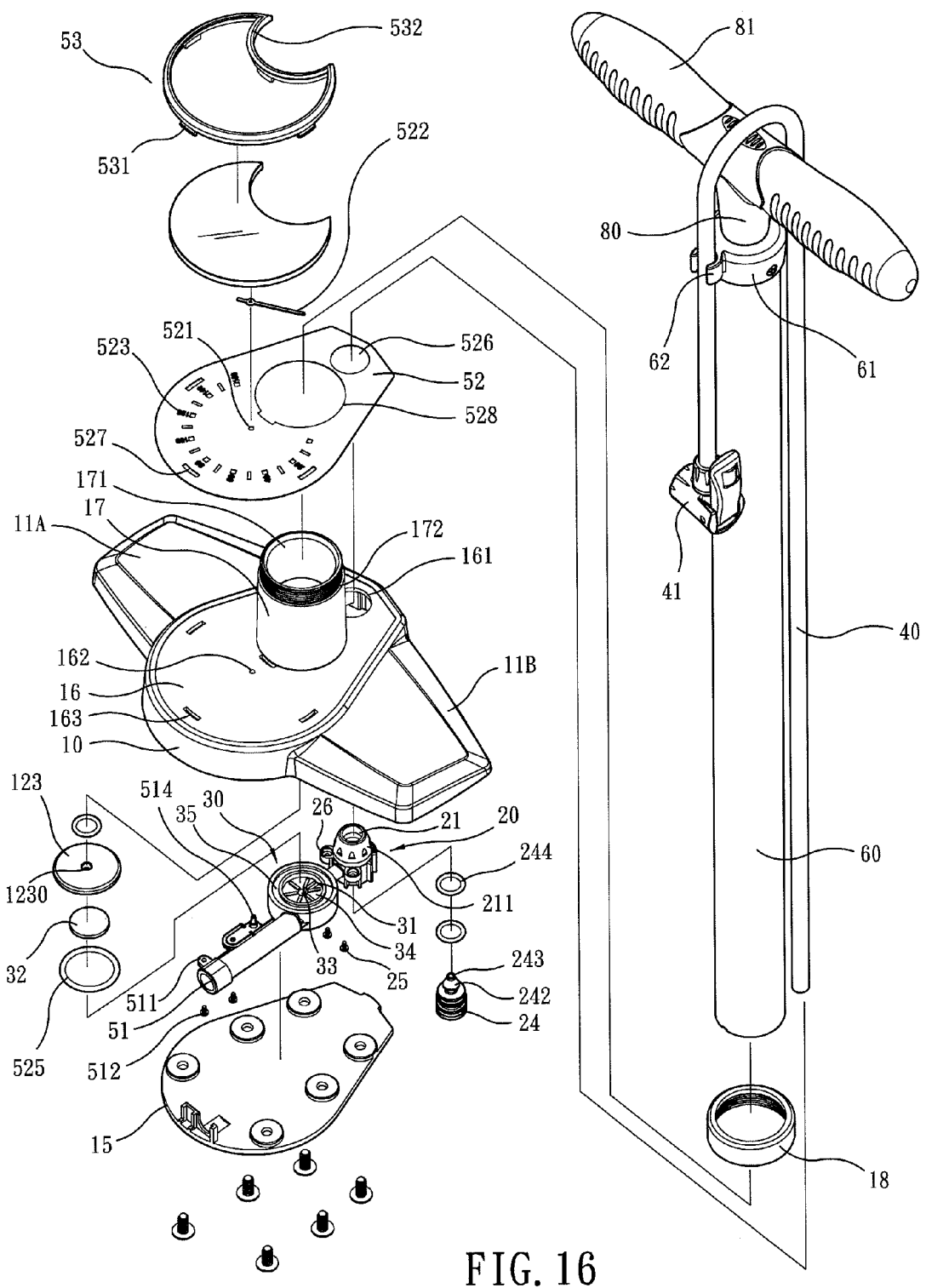
FIGS. 16 and 17 are exploded views showing a fourth non-limiting embodiment of the present invention.
Figure 17:
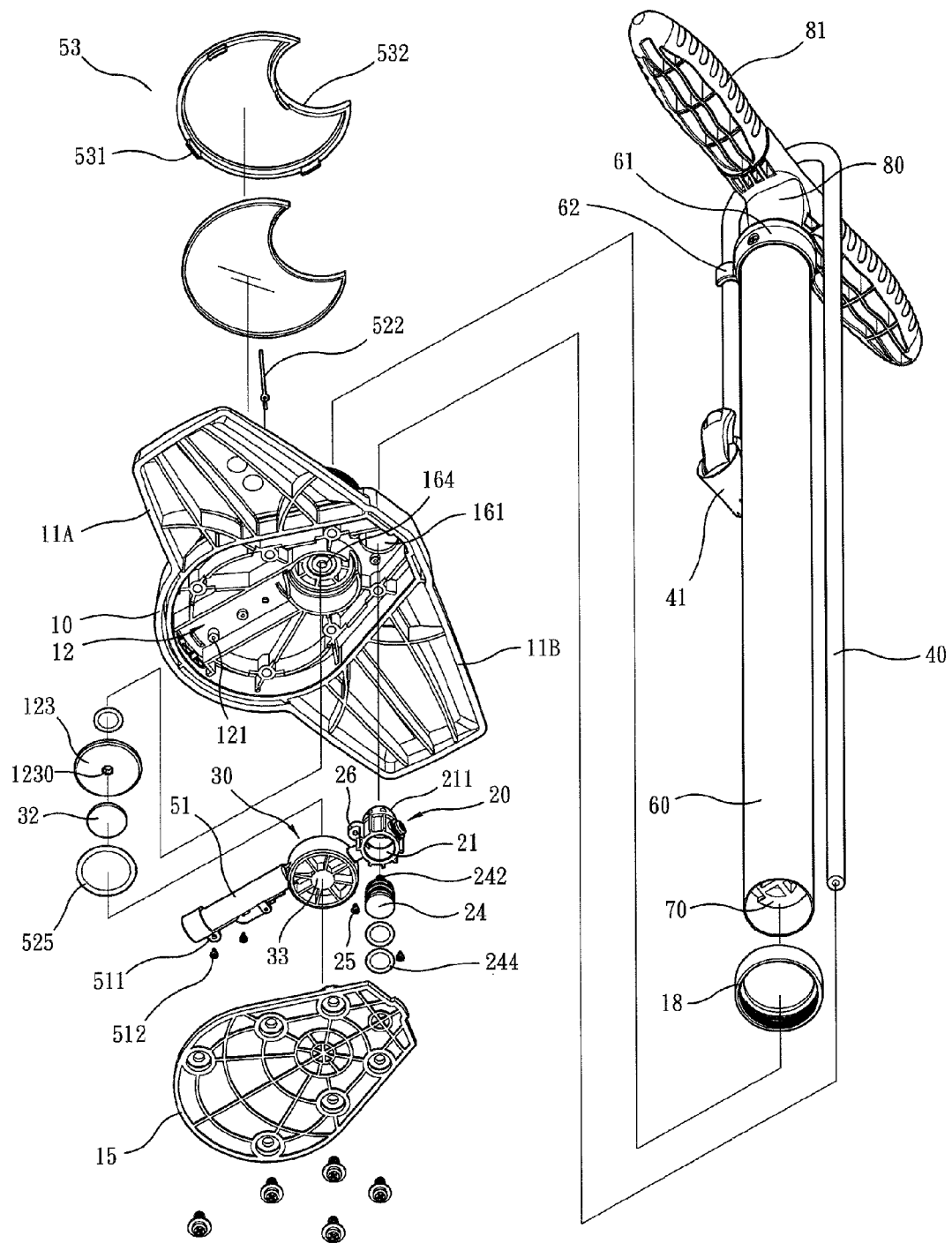
Figure 18:
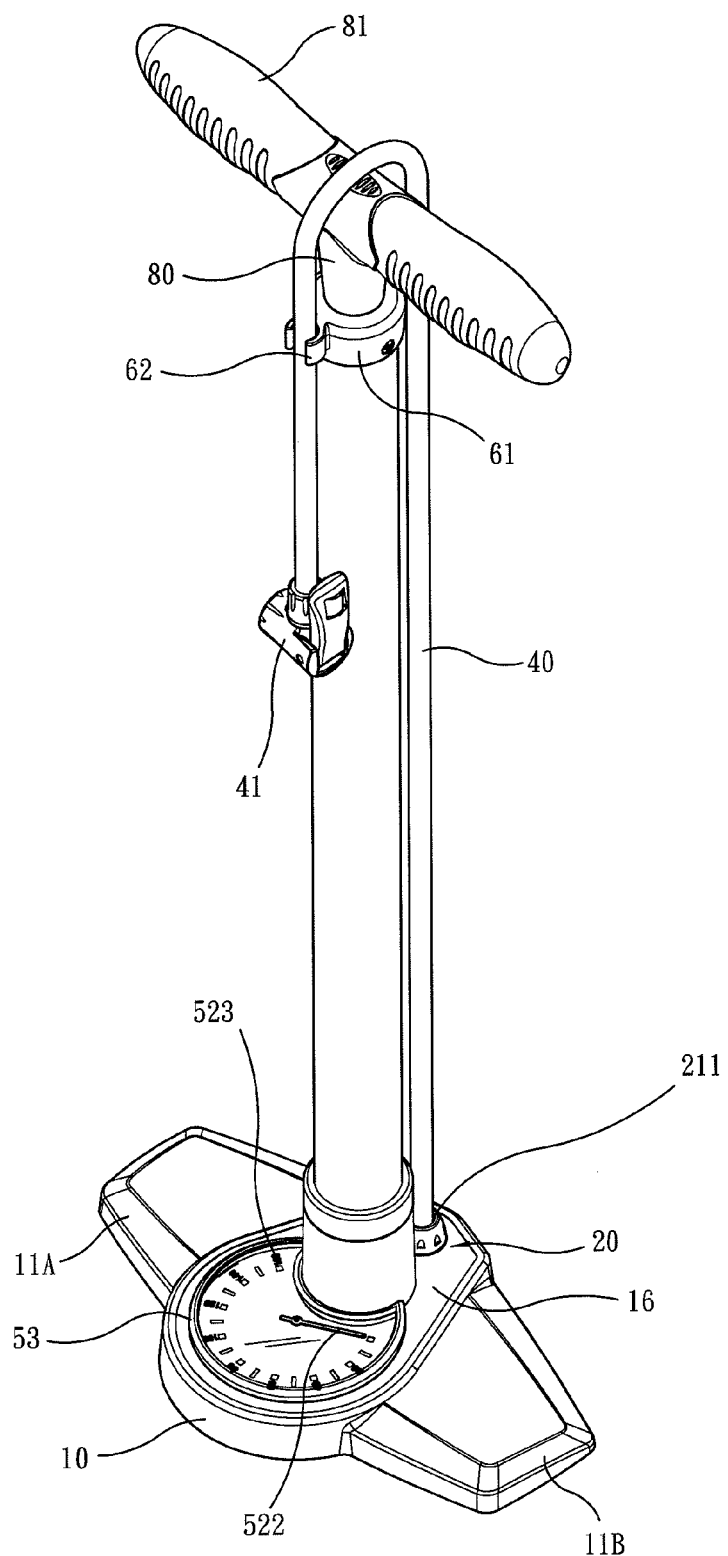
FIG. 18 is a schematic view showing the third non-limiting embodiment of the present invention when combining.
Figure 19:
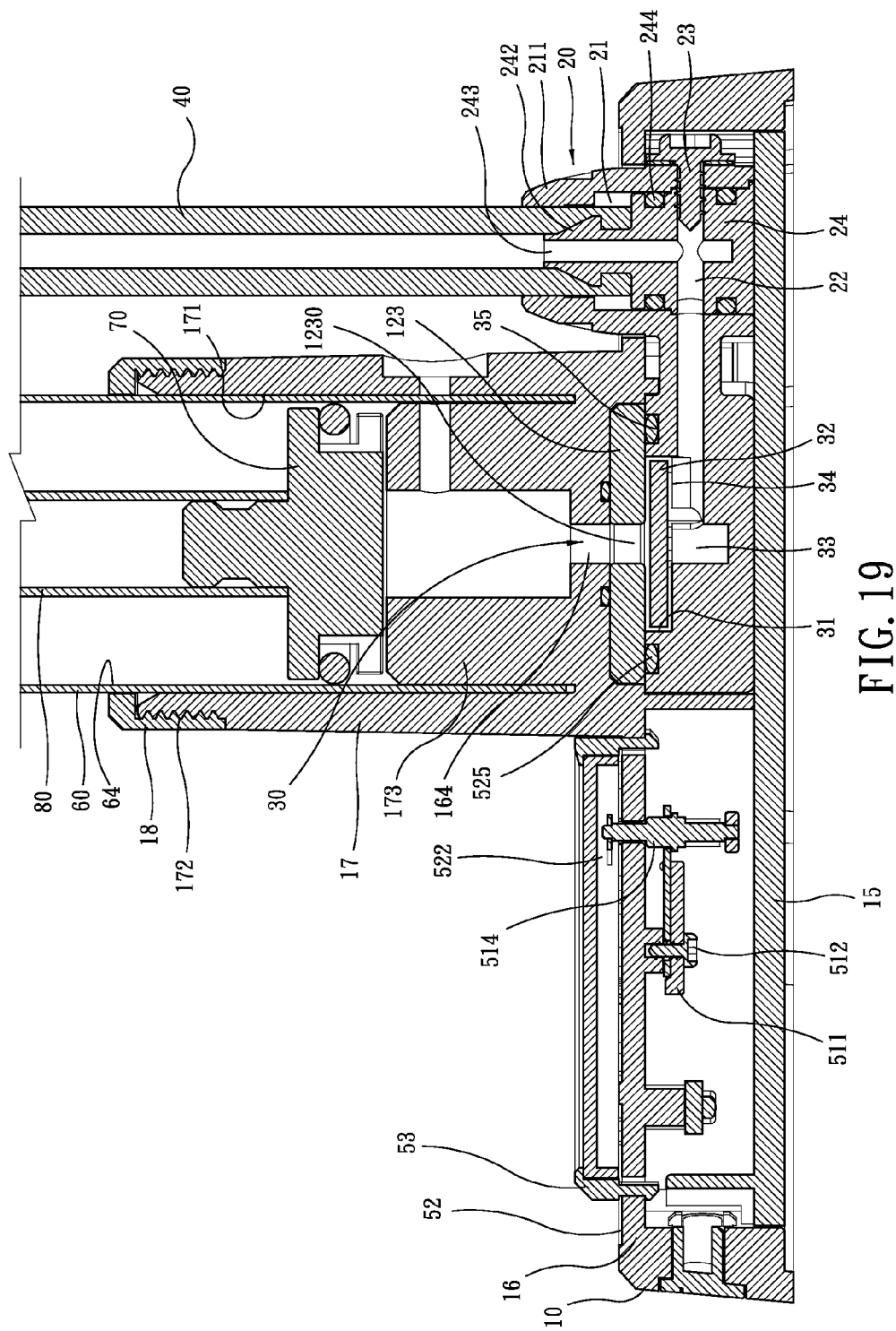
FIGS. 19 and 20 are the partly cross-sectional view showing the fourth non-limiting embodiment of the present invention when combining.
Figure 20:
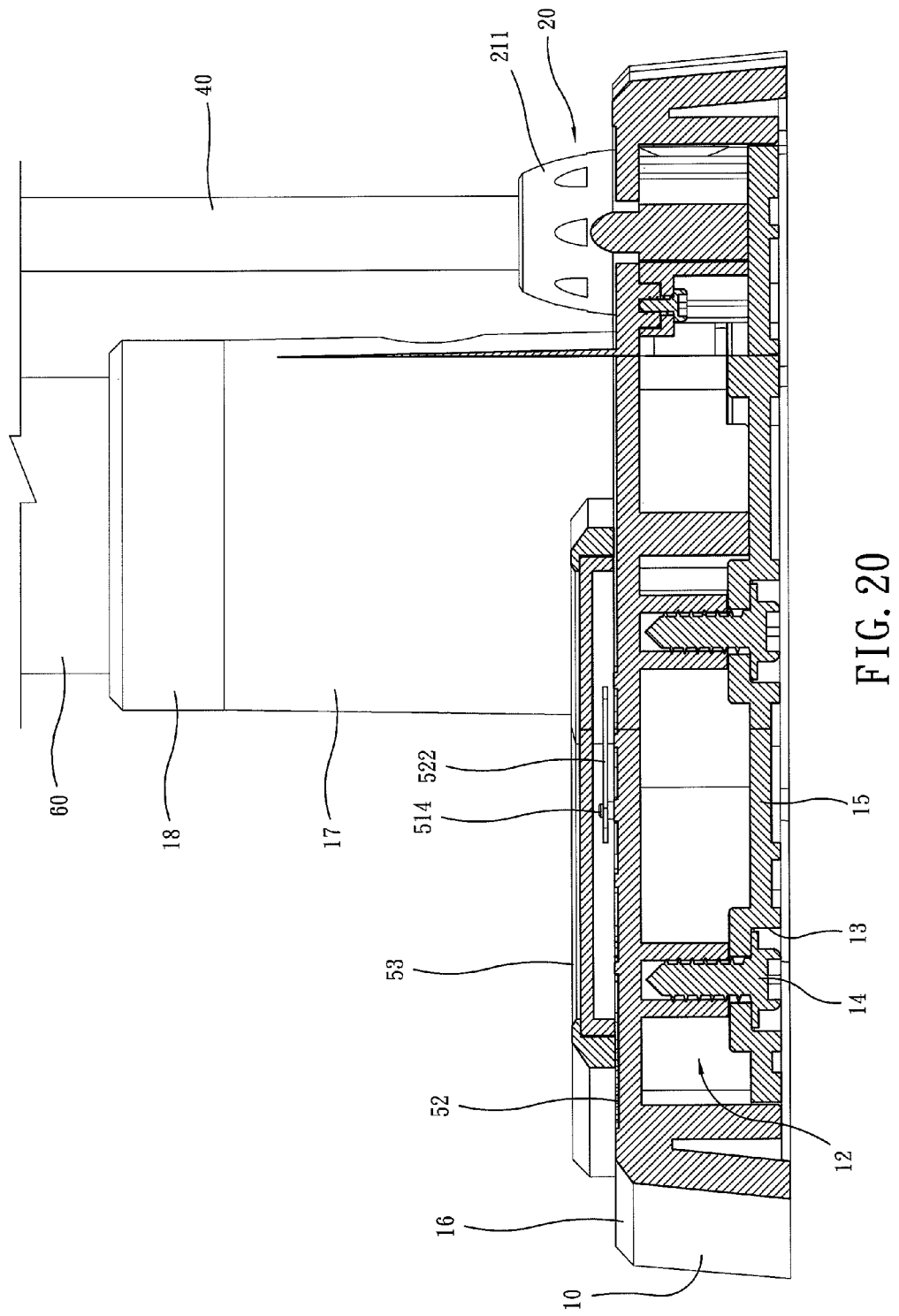
Figure 21:
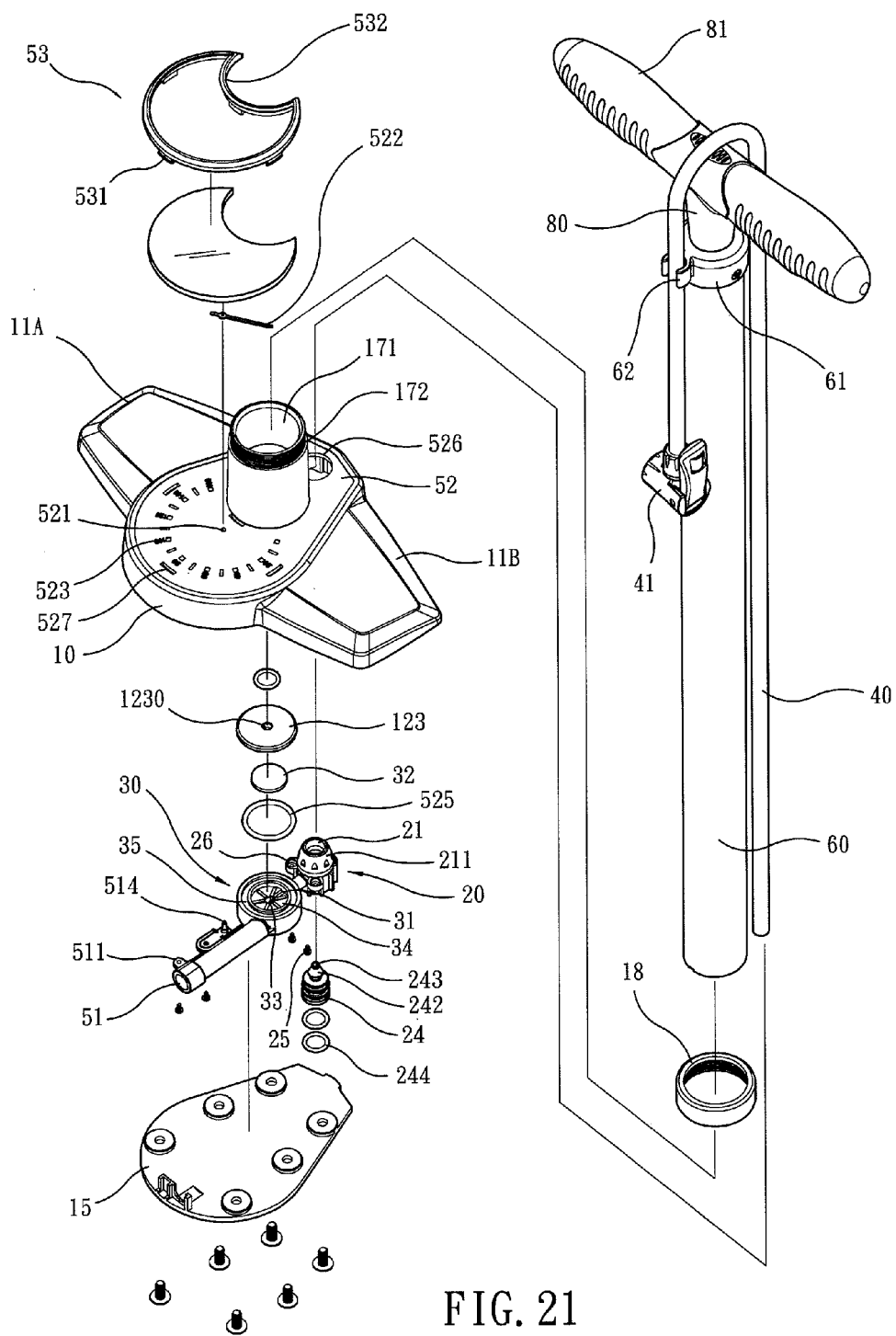
FIG. 21 is an exploded view showing a fifth non-limiting embodiment of the present invention.

Referring to FIG. 21, the fifth non-limiting embodiment of the present invention is shown. The fifth non-limiting embodiment of the present invention shows that the scale plate 52 shown in FIG. 16 is able to be integrated with the top cover 16.

While we have shown and described the embodiments in accordance with the present invention, it should be clear to those skilled in the art that further embodiments may be made without departing from the scope of the present invention.

I claim:

1. An air pump for measuring an air pressure comprising:
a base including a chamber room;
a one-way valve disposed at an inner side of said base and including an inlet chamber and a vent;
a pump pipe including a pipe hole with one end thereof connected to said vent and an air faucet disposed at the other end thereof;
a piezometer disposed in said chamber room for measuring an air pressure value of said vent;
a scale plate disposed at a top surface of said base for displaying said air pressure value of said piezometer, said scale plate further including an air-guiding hole communicating with said inlet chamber;
a cylinder fixed on said scale plate and including a cylinder hole communicating with said air-guiding hole;
a piston slidably disposed in said cylinder hole; and
a driving stem applied to drive said piston to pump gas in said cylinder hole so that said gas is forced to enter said inlet chamber of said one-way valve via said air-guiding hole to allow said vent to deliver said gas to said pump pipe and said piezometer unidirectionally so that said scale plate displays said air pressure value of said gas.

2. The air pump for measuring an air pressure as claimed in claim 1, wherein said chamber room is recessed downward from said top surface of said base, and said scale plate is fastened on said top surface of said base for sealing a top side of said chamber room.

3. The air pump for measuring an air pressure as claimed in claim 1, wherein said piezometer includes a piezometric head connected to said vent and a linking structure disposed therein for measuring said air pressure of said vent; said linking structure drives a shaft to rotate by a relative angle depending on different air pressures; said scale plate includes a shaft hole from which said shaft protrudes; an indicator is pivoted on a portion where said shaft protrudes; and said scale plate includes a scale disposed thereon for said indicator to display said air pressure value.

4. The air pump for measuring an air pressure as claimed in claim 2, wherein a shield is further disposed on said scale plate so that said shield covers a top surface of said scale plate for protecting said indicator and said scale.

5. The air pump for measuring an air pressure as claimed in claim 2, wherein a shield is further disposed on said scale plate; said shield includes a bracket hole for an insertion of a bottom side of said cylinder, so that said cylinder is fixed on said scale plate.

6. The air pump for measuring an air pressure as claimed in claim 1, wherein said one-way valve further includes an anti-reverse unit and sub-channel; said inlet chamber is recessed downward from said top surface of said base to provide said anti-reverse unit enough space to move upward and downward; said inlet chamber includes said vent defined at a bottom side thereof within a range of said anti-reverse unit; said sub-channel is formed at said bottom side and communicated with said vent, and said scale plate seals a top side of said inlet chamber.

7. The air pump for measuring an air pressure as claimed in claim 1, wherein a pipe-joint section is further disposed on said base so that a side of said pump pipe is connected to said pipe joint section.

8. The air pump for measuring an air pressure as claimed in claim 7, wherein said pump pipe includes a longitudinal hole, a joint hole, a fastener, and a joint; said longitudinal hole penetrates through said top surface of said base and a bottom surface of said base and provides a smaller hole diameter defined at an upper section and a larger hole diameter defined at a lower section; a collar unit protruding from said top surface of said base is applied to define said upper section with said smaller diameter of said longitudinal hole; said joint hole radially penetrates said lower section of said longitudinal hole and is communicated with said chamber room and said vent; said fastener is applied to seal an outer part of said joint hole; said joint is fixedly inserted in said longitudinal hole; a top edge of said joint includes a hook portion stretching into said collar unit and a guiding hole concavely defined on a top side of said hook portion for communicating with said joint hole; a leakproof washer is installed on said joint to prevent gas from leaking out of an engaged part of said longitudinal hole and said joint hole; a side of said pump pipe is inserted into said collar unit and said hook portion is tightly embedded into said pipe hole at a bottom side of said pump pipe for said guiding hole to intermediately communicate said pipe hole of said pump pipe with said joint hole.

9. The air pump for measuring an air pressure as claimed in claim 7, wherein said pipe joint section and said one-way valve are defined to separate from said base; said one-way valve is intermediately connected to said pipe-joint section and said piezometer as a combination which is then disposed in said chamber room of said base.

10. The air pump for measuring an air pressure as claimed in claim 9, wherein a bottom side of said pipe joint section is fixedly disposed on said chamber room; said pipe joint section includes a longitudinal hole, a joint hole, a fastener and a joint; said longitudinal hole penetrates through said pipe joint section and provides a smaller hole diameter defined at a upper section and a larger hole diameter defined at a lower section; a collar unit protruding from said top surface of said base is applied to define said upper section with said smaller diameter of said longitudinal hole, and said joint hole radially penetrates through said lower section of said longitudinal hole; said fastener seals a side of said joint hole; said joint is inserted into said longitudinal hole; a top edge of said joint includes a hook portion stretching into said collar unit and a guiding hole concavely defined on a top side of said hook portion for communicating with said joint hole; one side of said pump pipe is inserted into said collar unit and said hook portion is tightly embedded into said pipe hole at a bottom side of said pump pipe; said one-way valve includes an inlet chamber, an anti-reverse unit, a vent, and a sub-channel; said inlet chamber is recessed downward from said top surface of said one-way valve to provide said anti-reverse unit enough space to move upward and downward; said inlet chamber includes a vent defined at a bottom side thereof within a range of said anti-reverse unit; said vent is communicated with said joint hole; said sub-channel communicating with said vent is disposed at a bottom side of said inlet chamber, and said scale plate seals a top side of said inlet chamber; said piezometer includes a piezometric head; said piezometric head is airtightly aimed at a free end of said joint hole to communicate said vent; an inner part of said piezometer includes a linking structure for measuring said air pressure of said vent and said joint hole; said linking structure drives a shaft to rotate by a relative angle depending on different air pressure; said scale plate provides a shaft hole from which said shaft protrudes; an indicator is pivoted on a portion where said shaft protrudes; and said scale plate includes a scale disposed thereon for said indicator to display said air pressure value.

11. The air pump for measuring an air pressure as claimed in claim 9, wherein a shield is disposed on said scale plate, and said shield has a bracket hole defined thereon; said scale plate further has an alignment section matching to said bracket hole; said alignment section is communicated with said air-guiding hole, and an insert block is protruded at a border of said alignment section; a bottom side of said cylinder is correspondingly inserted in said bracket hole and said alignment section, and said cylinder has an insert groove matching to said insert block so that said cylinder is disposed upright on said scale plate.

12. An air pump for measuring air pressure comprising:
a base including a chamber room recessed upward from a bottom surface of said base;
a bottom cover is disposed to cover a bottom side of said chamber room of said base;
a one-way valve including an inlet chamber and a vent;
a pump pipe including a pipe hole with one end thereof connected to said vent and an air faucet disposed at the other end thereof;
a piezometer disposed in said chamber room for measuring an air pressure value of said vent;
a scale plate integrally disposed on a top surface of said base for displaying said air pressure value of said piezometer; an air-guiding hole is formed on said scale plate for communicating with said inlet chamber;
a cylinder disposed on said scale plate, said cylinder having a cylinder hole communicatnig with said air-guiding hole;
a piston slidably disposed in said cylinder hole; and
a driving stem applied to drive said piston to pump gas in said cylinder hole so that said gas is forced to enter said inlet chamber of said one-way valve via said air-guiding hole to allow said vent to deliver said gas to said pump pipe and said piezometer unidirectionally, and so that said scale plate displays said air pressure value of said gas.

13. The air pump for measuring an air pressure as claimed in claim 12, wherein a pipe joint section is further disposed on said base so that a side of said pump pipe is connected to said pipe joint section.

14. The air pump for measuring an air pressure as claimed in claim 13, wherein said pipe joint section and said one-way valve are defined to separate from said base; said one-way valve is intermediately connected to said pipe joint section and said piezometer as a combination which is then disposed in said chamber room of said base.

15. An air pump for measuring an air pressure comprising:
a base including a chamber room recessed upward from a bottom surface of said base for allowing a top cover to be disposed on a top surface of said base; a sleeve is integrally and upwardly extended from said top cover; a sleeve hole with an upward opening is defined on said sleeve; an air-guiding hole connecting to said sleeve hole penetrates through said top cover; a bottom cover is closed at a bottom side of said chamber room of said base;
a one-way valve including an inlet chamber and a vent;
a pump pipe included a pipe hole with one end thereof connected to said vent and an air faucet disposed at the other end thereof;
a piezometer disposed in said chamber room for measuring an air pressure value of said vent;
a scale plate integrally defined on a top surface of said top cover for displaying said air pressure valve of said piezometer;
a cylinder, a bottom side thereof being fixedly disposed in said sleeve hole, said cylinder including a cylinder hole for communicating with said air-guiding hole;
a piston slidably disposed in said cylinder hole; and
a driving stem applied to drive said piston to pump gas in said cylinder hole so that said gas is forced to enter said inlet chamber of said one-way valve via said air-guiding hole to allow said vent to deliver said gas to said pump pipe and said piezometer unidirectionally so that said scale plate displays said air pressure value of said gas;
wherein said scale plate includes a combining section for an insertion of said sleeve, and a shield is disposed to cover said scale plate.

16. The air pump for measuring an air pressure as claimed in claim 15, wherein a screwed section is disposed at an outer top border of said sleeve; said screwed section provides a collar screwing unit; a pillar with a diameter smaller than said sleeve hole is symmetrically disposed inside said sleeve hole; said air-guiding hole is disposed between said pillar and said top cover; said bottom side of said cylinder is correspondingly and fixedly inserted between said sleeve hole and said pillar; said bottom side of said cylinder is fixedly clamped between said sleeve hole and said pillar by said collar screwing unit.

17. The air pump for measuring an air pressure as claimed in claim 15, wherein a pipe joint section is additionally disposed on said base; said pipe-joint section is connected to one side of said pump pipe, said pipe joint section and said one-way valve are disposed to separate from said base so that said one-way valve is intermediately connected to said pipe-joint section and said piezometer as a combination which is then disposed in said chamber room of said base.

* * * * *